United States Patent
Hattori

(10) Patent No.: US 8,903,587 B2
(45) Date of Patent: Dec. 2, 2014

(54) NON-MANIPULATION OPERATION SYSTEM AND METHOD FOR PREPARING FOR NON-MANIPULATION OPERATION OF VEHICLE

(75) Inventor: Toshihiro Hattori, Okazaki (JP)

(73) Assignee: DENSO CORPORATION, Kariya (JP)

( * ) Notice: Subject to any disclaimer, the term of this patent is extended or adjusted under 35 U.S.C. 154(b) by 676 days.

(21) Appl. No.: 13/280,468

(22) Filed: Oct. 25, 2011

(65) Prior Publication Data

US 2012/0101660 A1    Apr. 26, 2012

(30) Foreign Application Priority Data

Oct. 26, 2010  (JP) .................................. 2010-239812
Apr. 22, 2011  (JP) .................................. 2011-96293

(51) Int. Cl.
G05D 1/00    (2006.01)

(52) U.S. Cl.
CPC ...... *G05D 1/0022* (2013.01); *G05D 2201/0212* (2013.01); *G05D 1/0061* (2013.01); *G05D 1/0011* (2013.01); *G05D 2201/0213* (2013.01)
USPC .............................................. 701/23; 701/2

(58) Field of Classification Search
USPC ....................................................... 701/2, 23
See application file for complete search history.

(56) References Cited

U.S. PATENT DOCUMENTS

| | | | |
|---|---|---|---|
| 6,097,314 A | 8/2000 | Desens et al. | |
| 6,694,248 B2* | 2/2004 | Smith et al. | 701/117 |
| 6,965,816 B2* | 11/2005 | Walker | 701/16 |
| 7,158,657 B2 | 1/2007 | Okazaki et al. | |
| 8,060,873 B2* | 11/2011 | Ceskutti et al. | 717/177 |
| 8,346,578 B1* | 1/2013 | Hopkins et al. | 705/4 |
| 2003/0202683 A1 | 10/2003 | Ma et al. | |
| 2008/0228562 A1* | 9/2008 | Smith et al. | 705/13 |
| 2010/0017236 A1* | 1/2010 | Duddle et al. | 705/4 |
| 2011/0112719 A1 | 5/2011 | Marumoto et al. | |
| 2012/0021386 A1* | 1/2012 | Anderson et al. | 434/66 |
| 2013/0218603 A1* | 8/2013 | Hagelstein et al. | 705/4 |
| 2013/0304513 A1* | 11/2013 | Hyde et al. | 705/4 |
| 2013/0304514 A1* | 11/2013 | Hyde et al. | 705/4 |

FOREIGN PATENT DOCUMENTS

| | | | |
|---|---|---|---|
| GB | 2427295 A | * | 12/2006 |
| JP | A-61-257329 | | 11/1986 |
| JP | A-03-142507 | | 6/1991 |
| JP | A-05-66271 | | 3/1993 |
| JP | A-07-87623 | | 3/1995 |

(Continued)

OTHER PUBLICATIONS

Office Action mailed Jul. 10, 2012 in corresponding JP Application No. 2011-096293 (and English translation).

*Primary Examiner* — Shelley Chen
(74) *Attorney, Agent, or Firm* — Posz Law Group, PLC

(57) ABSTRACT

A notification unit causes a notification device to notify that a consent input person has whereabouts of a responsibility related to a non-manipulation operation to operate a vehicle without manipulation of an occupant of the vehicle. An information acquisition unit obtains consent-input person information for identifying the consent input person who inputs a consent into an operation unit, after the notification unit notifies the whereabouts of the responsibility. A record unit associates consent information on the inputted consent with the obtained consent-input person information to cause a storage unit to store the associated information. A control unit starts the non-manipulation operation of the vehicle, in response to input of the consent, after the notification unit notifies the whereabouts of the responsibility.

28 Claims, 14 Drawing Sheets

(56) References Cited

FOREIGN PATENT DOCUMENTS

| | | |
|---|---|---|
| JP | A-H10-207504 | 8/1998 |
| JP | A-2001-001866 | 1/2001 |
| JP | A-2005-75015 | 3/2005 |
| JP | 2005252458 A * 9/2005 ............ H04M 11/00 |
| JP | A-2006-298115 | 11/2006 |
| JP | A-2006-306233 | 11/2006 |
| JP | A-2007-69720 | 3/2007 |
| JP | A-2008-243015 | 10/2008 |
| JP | B2-4207298 | 10/2008 |
| JP | A-2008-302711 | 12/2008 |
| JP | A-2009-169486 | 7/2009 |
| JP | A-2009-292254 | 12/2009 |
| JP | A-2010-221874 | 10/2010 |

* cited by examiner

US 8,903,587 B2

NON-MANIPULATION OPERATION SYSTEM AND METHOD FOR PREPARING FOR NON-MANIPULATION OPERATION OF VEHICLE

CROSS REFERENCE TO RELATED APPLICATIONS

This application is based on and claims priority to Japanese Patent Applications No. 2010-239812 filed on Oct. 26, 2010 and No. 2011-96293 filed on Apr. 22, 2011, the contents of which are incorporated in their entirely herein by reference.

FIELD OF THE INVENTION

The present invention relates to a non-manipulation operation system, which does not need manipulation of an occupant for operating a vehicle, regardless that an occupant is in the vehicle or an occupant is not in the vehicle. The present invention further relates to a method for preparing for a non-manipulation operation of the vehicle.

BACKGROUND OF THE INVENTION

A vehicle occupant non-manipulation operation may be categorized into an automatic driving operation and a remote driving operation. The automatic driving operation is implemented to operate the vehicle automatically without manipulation of a person. The remote driving operation is implemented to operate the vehicle by using a remote operation device via which a person transmits an instruction to operate the vehicle. The remote operation device may be located outside of the vehicle or may be carried by a person.

JP-A-3-142507 discloses a conventional former one, i.e., the automatic driving operation. According to JP-A-3-142507, the automatic driving operation of the vehicle is started on permission made by using an automatic operation permission switch. Thereby, the automatic driving operation is implemented automatically to drive the vehicle along a guideline on a running route surface.

When an accident occurs during the automatic driving operation, an operator who manipulated the automatic operation permission switch is supposed to take a responsibility for the accident. However, in the conventional art, the operator who manipulated the automatic operation permission switch cannot be identified. Therefore, when an accident occurs during the automatic driving operation, the whereabouts of the responsibility cannot be identified. In addition, in a case of the remote driving operation, a person who remote-controls the vehicle is supposed to take the responsibility for an accident caused in the remote driving operation. It is noted that the person who implements the remote driving operation does not necessarily recognize to take the responsibility for an accident caused in the remote driving operation. When an accident occurs in the remote driving operation and when the person who implements the remote driving operation does not recognize to take the responsibility for the accident caused in the remote driving operation, the whereabouts of the responsibility may be argued.

SUMMARY OF THE INVENTION

In view of the foregoing and other problems, it is an object of the present injection to produce a vehicle occupant non-manipulation operation system, which can clarify whereabouts of a responsibility when an accident occurs in an automatic driving operation.

According to an aspect of the present invention, a non-manipulation operation system comprises a notification unit configured to, before start of a non-manipulation operation to operate a vehicle without manipulation of an occupant of the vehicle, cause a notification device to notify that a consent input person has whereabouts of a responsibility related to the non-manipulation operation. The non-manipulation operation system further comprises a consent-input person information acquisition unit configured to, after the notification unit notifies the whereabouts of the responsibility, obtain consent-input person information for identifying the consent input person who inputs a consent into an operation unit. The non-manipulation operation system further comprises a record unit configured to associate consent information on the consent inputted into the operation unit with the consent-input person information obtained by the consent-input person information acquisition unit to cause a consent-input person information storage unit to store the consent information and the consent-input person information being associated. The non-manipulation operation system further comprises a non-manipulation operation control unit configured to, after the notification unit notifies the whereabouts of the responsibility, start the non-manipulation operation of the vehicle, in response to input of the consent into the operation unit.

According to another aspect of the present invention, a method for preparing for a non-manipulation operation to operate a vehicle without manipulation of an occupant of a vehicle, the method comprises receiving input of a consent to the non-manipulation operation from a consent input person. The method further comprises notifying that the consent input person has whereabouts of a responsibility related to the non-manipulation operation. The method further comprises obtaining consent-input person information for identifying the consent input person. The method further comprises associating consent information on the inputted consent with the obtained consent-input person information. The method further comprises storing the consent information and the consent-input person information being associated. The method further comprises starting the non-manipulation operation in response to receiving the input of the consent after the notifying.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

A vehicle automatic operation system 1 according to the first embodiment is configured to implement an automatic driving operation (non-manipulation operation). The present first embodiment will be described with reference to FIGS. 1 to 6.

Figure 1:
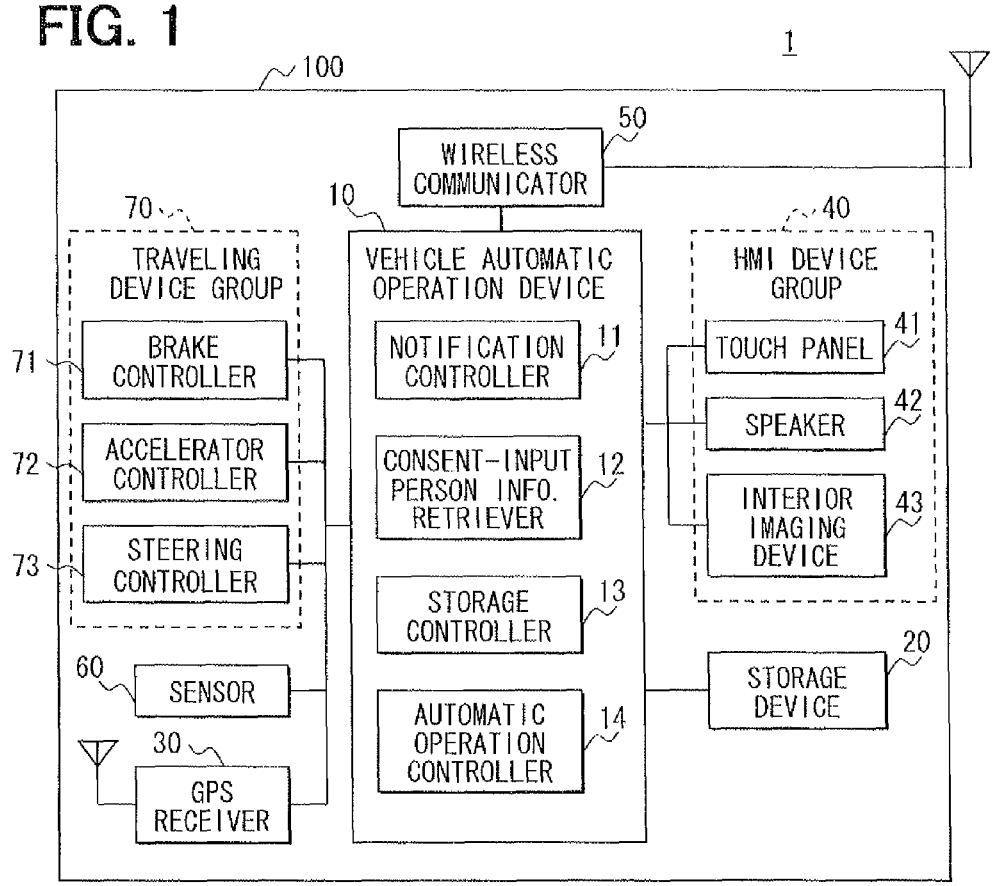
FIG. 1 is a block diagram showing a vehicle automatic operation system according to the first embodiment.

As shown in FIG. 1, the vehicle automatic operation system 1 according to the present embodiment has a configuration including a vehicle automatic operation device 10 equipped in a vehicle 100. The vehicle 100 further includes a vehicle-side storage device 20, a GPS receiver 30, a human interface (HMI) device group 40, a vehicle-side wireless communication device 50, a sensor 60, a traveling device group 70, and the like, in addition to the vehicle automatic operation device 10. The vehicle automatic operation device 10 is configured to implement various automatic driving operations of the vehicle 100. For example, the vehicle automatic operation device 10 implements automatic traveling to drive the vehicle 100 automatically along a path toward a destination and automatic parking to park the vehicle 100 automatically at a target parking partition. The vehicle automatic operation device 10 further implements automatic tailing to cause the vehicle 100 to follow automatically an object preceding the vehicle and automatic braking to cause the vehicle 100 automatically to brake so as to prevent the vehicle 100 from colliding with an obstacle.

The vehicle automatic operation device 10 is a computer device, which may have a generally-known configuration including a CPU and a built-in memory (none shown). The CPU executes a program stored in the built-in memory thereby to implement various functions. As follows, the vehicle automatic operation device 10 will be described. In the present example, the vehicle automatic operation device 10 includes functional units such as a notification control unit 11, a consent-input person information acquisition unit 12, a storage control unit 13, and an automatic operation control unit 14, so as to implement various functions.

The vehicle-side storage device 20 includes storage device(s) such as a hard disk drive, a digital versatile disc (DVD) device, a compact disc (CD) device, a flash memory device, and/or the like for storing various data. The vehicle-side storage device 20 may function as a vehicle-side storage unit.

The vehicle-side storage device 20 according to the present embodiment stores various data, such as map information including road data, and a map image. The various data further includes an automatic traveling start instruction image, an automatic parking start instruction image, an automatic tailing start instruction image, an automatic braking start instruction image, a destination setting image, a target parking partition setting image, a target preceding vehicle setting image, and the like. The automatic traveling start instruction image is used for instructing to start the automatic traveling. The automatic parking start instruction image is used for instructing to start the automatic parking. The automatic tailing start instruction image is used for instructing to start the automatic tailing. The automatic braking start instruction image is used for instructing to start regular automatic braking. The destination setting image is used for setting the destination. The target parking partition setting image is used for setting a target parking partition. The target preceding vehicle setting image is used for setting a preceding vehicle to be tailed by the vehicle 100.

The vehicle-side storage device 20 according to the present embodiment further stores various data such as various images and voices. Specifically, the various data includes a responsibility assignation notification image and a responsibility assignation notification voice to notify that the consent input person has a responsibility related to the automatic driving operation of the vehicle 100. The various data includes an insurance content notification image and an insurance content notification voice to notify a content of an insurance applied when an accident occurs during the automatic driving operation of the vehicle 100. The various data includes a consent input operation image for inputting a consent to the automatic driving operation of the vehicle 100. The various data includes a disapproval reason notification image and a disapproval reason notification voice to notify that the automatic driving operation of the vehicle 100 is not started since the consent is not obtained.

The vehicle-side storage device 20 is connected to the vehicle automatic operation device 10. The vehicle automatic operation device 10 is configured timely to read the various data from the vehicle-side storage device 20. The vehicle automatic operation device 10 is further configured timely to associate the consent information with the consent-input person information and write the associated consent information and the consent-input person information in the vehicle-side storage device 20. The vehicle-side storage device 20 may function as a consent-input person information storage unit.

The GPS receiver 30 includes a GPS antenna. The GPS receiver 30 is connected to the vehicle automatic operation device 10. The GPS receiver 30 receives a GPS signal emitted from multiple GPS satellites (not shown) at a predetermined interval and outputs the received GPS signal to the vehicle automatic operation device 10. When receiving the GPS signal from the GPS receiver 30, the vehicle automatic operation device 10 detects the present position of the vehicle 100 based on the GPS signal. Through detection of the present position of the vehicle 100, the vehicle automatic operation device 10 reads the map information stored in the vehicle-side storage device 20. The vehicle automatic operation device 10 further implements a generally-known map matching operation according to a travel locus of the vehicle 100 and road data thereby to correct an error in the present position specified based on the GPS signal.

The HMI device group 40 includes a touch panel 41, a speaker 42, a vehicle interior imaging device 43, and the like. The HMI device group 40 is connected to the vehicle automatic operation device 10.

The touch panel 41 has a configuration including a generally-known touch panel device. The touch panel 41 is located at a position to enable a driver seated on a driver's seat in the interior of the vehicle 100 to visually recognize the touch panel 41 and operate the touch panel 41. The vehicle automatic operation device 10 reads the image data among the various data from the vehicle-side storage device 20. The vehicle automatic operation device 10 further indicates the read image data as an image in an indication region of the touch panel 41. The vehicle automatic operation device 10 further determines whether the image indicated in the indication region of the touch panel 41 is touched.

For example, when it is determined that the automatic traveling start instruction image indicated on the indication region of the touch panel 41 is touched, the vehicle automatic operation device 10 determines that the start instruction of the automatic traveling is inputted. In this way, the driver of the vehicle 100 can input the automatic traveling start instruction into the vehicle automatic operation device 10. Similarly, the driver of the vehicle 100 can input the automatic parking start instruction, the automatic tailing start instruction, and the automatic braking start instruction into the vehicle automatic operation device 10.

The notification control unit 11 of the vehicle automatic operation device 10 reads the responsibility assignation notification image and the insurance content notification image among the various data from the vehicle-side storage device 20, before the automatic driving operation of the vehicle 100 starts. Thus, the notification control unit 11 indicates the read image in the indication region of the touch panel 41. In this way, the notification control unit 11 can visually notify that the consent input person has the responsibility related to the automatic driving operation of the vehicle 100. In addition, the notification control unit 11 can visually notify the content of the insurance applied when an accident occurs during the automatic driving operation of the vehicle 100. The notification control unit 11 may function as a notification unit. The touch panel 41 may function as a notification device.

The speaker 42 is configured to include a generally-known speaker device. The notification control unit 11 of the vehicle automatic operation device 10 reads the responsibility assignation notification voice and the insurance content notification voice among the various data from the vehicle-side storage device 20 and causes the speaker 42 to output the read voice. In this way, the notification control unit 11 can audibly notify that the consent input person has the responsibility related to the automatic driving operation of the vehicle 100. In addition, the notification control unit 11 can audibly notify the content of the insurance applied when an accident occurs during the automatic driving operation of the vehicle 100. The speaker 42 may function as a notification device.

The vehicle automatic operation device 10 causes the touch panel 41 and the speaker 42 to notify that the consent input person has the responsibility related to the automatic driving operation of the vehicle 100. The vehicle automatic operation device 10 further causes the touch panel 41 to notify the content of the insurance applied when an accident occurs during the automatic driving operation of the vehicle 100. Thereafter, the vehicle automatic operation device 10 reads the consent input operation image among the various data from the vehicle-side storage device 20. Thus, the vehicle automatic operation device 10 indicates the read consent input operation image in the indication region of the touch panel 41. The vehicle automatic operation device 10 further determines whether the consent input operation image indicated in the indication region of the touch panel 41 is touched. The vehicle automatic operation device 10 determines that the consent is inputted into the touch panel 41 when determining that the consent input operation image is touched. The driver of the vehicle 100 can input the consent to the automatic driving operation of the vehicle 100 into the vehicle automatic operation device 10 in this way. The touch panel 41 may function as an operation unit.

In the present embodiment, the touch panel 41 is employed as a part of the notification device and the operation device. The notification device and the operation device are not limited to the present example. A generally known display device may be employed as a part of the notification device. In this case, for example, multiple push buttons may be employed as the operation device. The operation device is not limited to a touch panel or multiple push buttons. A generally-known micro phone and/or a voice recognition device may be employed as the operation device. In this case, the consent to the automatic driving operation of the vehicle can be inputted into to the vehicle automatic operation device 10 by using voice recognition.

When determining that the consent input operation image indicated in the indication region of the touch panel 41 is not touched, the vehicle automatic operation device 10 indicates the disapproval reason notification image in the indication region of the touch panel 41. In addition, the vehicle automatic operation device 10 causes the speaker 42 to output the disapproval reason notification voice.

When the vehicle automatic operation device 10 determines that the consent input operation image indicated in the indication region of the touch panel 41 is touched and when the consent to the automatic driving operation of the vehicle 100 is inputted into the vehicle automatic operation device 10, the vehicle automatic operation device 10 obtains consent information. The consent information is on the inputted consent. More specifically, the consent information is used for identifying the consent to the automatic driving operation of the vehicle 100, such as the time and date information when the consent is inputted. In the present embodiment, the time and date information is information on the time and date contained in the GPS signal received by the GPS receiver 30. The time and date information is not limited to the information on the time and date contained in the GPS signal. Alternatively, the time and date information may be information on the time and date of a built-in clock device having a time counting function. The time and date information may be equivalent to consent information.

The vehicle interior imaging device 43 is configured to include a generally-known imaging device. The vehicle interior imaging device 43 is located at a position in the interior of the vehicle 100 such that the vehicle interior imaging device 43 can obtain an image of the face of the driver seated on the driver's seat. When the consent-input person information acquisition unit 12 of the vehicle automatic operation device 10 determines that the consent input operation image indicated in the indication region of the touch panel 41 is touched and when the consent to the automatic driving operation of the vehicle 100 is inputted into the vehicle automatic operation device 10, the consent-input person information acquisition unit 12 causes the vehicle interior imaging device 43 to obtain an image of the driver's face, i.e., the consent input person's face. Thus, the consent-input person information acquisition unit 12 obtains the image of the driver's face as facial image information of the driver. The vehicle interior imaging device 43 is equivalent to an imaging device. The facial image information is equivalent to consent-input person information. The consent-input person information acquisition unit 12 is equivalent to a consent-input person information acquisition device.

When the consent to the automatic driving operation of the vehicle 100 is inputted into the vehicle automatic operation device 10 and when the storage control unit 13 of the vehicle automatic operation device 10 obtains the consent information and the consent-input person information, the storage control unit 13 associates the consent information with the consent-input person information. Further, the storage control unit 13 writes the associated consent information and the consent-input person information in the vehicle-side storage device 20 thereby to store the information in the vehicle-side storage device 20. The storage control unit 13 may function as a record unit.

When the vehicle automatic operation device 10 receives one of the automatic traveling start instruction, the automatic parking start instruction, the automatic tailing start instruction, and the automatic braking start instruction to start the automatic driving operation, the vehicle automatic operation device 10 causes the vehicle interior imaging device 43 to start imaging of the face of the driver of the vehicle 100. Further, the vehicle automatic operation device 10 detects an actual eye closing time and a deviation time according to the presently obtained facial image information of the driver. The actual eye closing time is a time period in which the driver's eyelids are closed. The deviation time is a time period in which the visual axis of the driver deviates from a predetermined region. The predetermined region includes the direction of the visual axis where the driver is supposed to confirm when operating the vehicle 100.

When determining that the actual eye closing time is greater than or equal to a predetermined determination time period, such as one minute, the vehicle automatic operation device 10 determines that the driver of the vehicle 100 is in asleep. Thus, the vehicle automatic operation device 10 causes the speaker 42 to output an annunciation sound. In this way, the driver of the vehicle 100 can be restricted from being in asleep in the automatic driving operation. When determining that the driver of the vehicle 100 continues being in asleep in spite of the annunciation sound, the vehicle automatic operation device 10 may automatically cause the traveling device group 70 to stop the vehicle 100, in addition to causing the speaker 42 to output the annunciation sound.

In addition, when determining that the deviation time is greater than or equal to a predetermined determination time period, such as one minute, the vehicle automatic operation device 10 determines that the driver of the vehicle 100 looks away. Thus, the vehicle automatic operation device 10 causes the speaker 42 to output an annunciation sound. In this way, the driver of the vehicle 100 can be restricted from looking away in the automatic driving operation. When determining that the driver of the vehicle 100 continues looking away in spite of the annunciation sound, the vehicle automatic operation device 10 may automatically cause the traveling device group 70 to stop the vehicle 100, in addition to causing the speaker 42 to output the annunciation sound.

The person who touches the touch panel 41 actually to input the consent is the consent input person, i.e., a person responsible in the driving operation. In the present embodiment, the consent input person is the driver of the vehicle 100. It is noted that a mere occupant, who is not the driver of the vehicle 100, may be the consent input person. That is, not only the driver of the vehicle 100 but also a mere occupant of the vehicle 100 may be the consent input person. In consideration of this, the vehicle interior imaging device 43 may be configured to include two or more vehicle interior imaging device. In this case, one vehicle interior imaging device may be located at a position to enable acquisition of an image of a face of an occupant in the vehicle interior, and another vehicle interior imaging device may be located at a position to enable acquisition of an image of a face of the driver of the vehicle 100.

The vehicle-side wireless communication device 50 is configured to include an antenna and is connected to the vehicle automatic operation device 10. The vehicle-side wireless communication device 50 exchanges various information with a base station 200 via electric waves in a suitable frequency band. When the consent to the automatic driving operation of the vehicle 100 is inputted into the vehicle automatic operation device 10 and when the storage control unit 13 of the vehicle automatic operation device 10 obtains the consent information and the consent-input person information, the storage control unit 13 causes the vehicle-side wireless communication device 50 to transmit the consent information and the consent-input person information to the base station 200. The vehicle-side wireless communication device 50 may function as a vehicle-side wireless communication unit.

Figure 2:
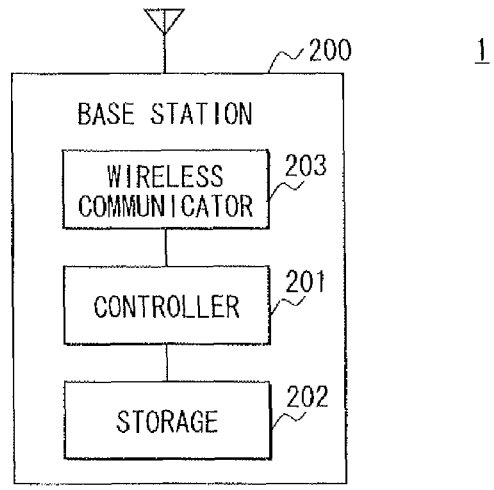
FIG. 2 is a block diagram showing a base station for implementing wireless communications with a vehicle automatic operation device according to the first embodiment.

The base station 200 will be described with reference to FIG. 2. As shown in FIG. 2, the base station 200 is configured to include a basestation-side control device 201, a basestation-side storage device 202, and basestation-side wireless communication unit 203.

The basestation-side control device 201 is a computer device, which may have a generally-known configuration including a CPU and a built-in memory (none shown). The CPU executes a program stored in the built-in memory thereby to implement various functions. The basestation-side storage device 202 is configured to include a storage device such as a hard disk drive, a flash memory device, and/or the like. The basestation-side storage device 202 is connected to the basestation-side control device 201. The basestation-side wireless communication unit 203 is configured to include an antenna and is connected to the basestation-side control device 201. The basestation-side wireless communication unit 203 exchanges various information with the vehicle-side wireless communication device 50 of the vehicle 100 via electric waves in a suitable frequency band.

When the basestation-side wireless communication unit 203 receives the consent information and the consent-input person information transmitted from the vehicle 100, the basestation-side control device 201 associates the consent information with the consent-input person information. The basestation-side control device 201 writes the associated information in the basestation-side storage device 202 of the base station 200 thereby to store the associated information in the basestation-side storage device 202. When the basestation-side control device 201 completes writing of the consent information and the consent-input person information being associated in the basestation-side storage device 202, the basestation-side control device 201 causes the basestation-side wireless communication unit 203 to transmit a record end signal to the vehicle 100. The record end signal denotes that the basestation-side control device 201 completes the writing of the associated information. The vehicle automatic operation device 10 receives the record end signal via the vehicle-side wireless communication device 50, thereby to recognize that the consent information and the consent input are stored in the basestation-side storage device 202. The vehicle-side wireless communication device 50, the basestation-side control device 201, the basestation-side wireless communication unit 203, and the like may function as a record unit. The basestation-side storage device 202 may function as a basestation-side storage unit and a consent-input person information storage unit.

The sensor 60 is configured to include, for example, an ultrasonic sonar, an electric wave radar, and/or an imaging sensor and is connected to the vehicle automatic operation device 10.

The ultrasonic sonar is configured to include a microphone for transmitting and receiving an ultrasonic wave and is located at a front bumper and/or a rear bumper of the vehicle 100. The ultrasonic sonar is configured to radiate an ultrasonic wave around the vehicle 100 and to receive a wave reflected from an obstacle, such as a pedestrian, when the obstacle exists around the vehicle 100. The ultrasonic sonar is configured to detect existence of an obstacle in the circumference around the vehicle 100 and calculate the distance from the obstacle when the obstacle exists according to the radiated ultrasonic wave and the reflective wave. The ultrasonic sonar is further configured to output the obtained information, such as the distance, to the vehicle automatic operation device 10. The circumference around the vehicle 100 denotes, for example, an area, such as a several-meter region, around each of the corners of the vehicle 100 and the rear end surface of the vehicle 100.

The electric wave radar is configured to include a microphone configured to transmit and receive an electric wave in a millimeter wave band. The electric wave radar may be located at a front bumper of the vehicle 100. The electric wave radar is configured to radiate an electric wave in a millimeter wave band ahead of the vehicle 100 and to receive a reflective wave reflected on a rear end surface of a preceding vehicle when the preceding vehicle exists ahead of the vehicle 100 on the same cruising lane. The electric wave radar is configured to detect existence of a preceding vehicle ahead of the vehicle 100 and to calculate the distance from the preceding vehicle and a relative velocity to the preceding vehicle, according to the radiated electric wave and the reflective wave. The electric wave radar is further configured to output the obtained information, such as the distance, to the vehicle automatic operation device 10. The ahead of the vehicle 100 denotes, for example, an area, such as a hundred-meter region, from the body of the vehicle 100. The electric wave radar according to the present embodiment is configured to utilize the electric wave in the millimeter wave band. It is noted that the frequency of the electric wave may be arbitrarily modified. The radar is not limited to utilize an electric wave. A laser radar utilizing a laser light may be employed as the radar. It suffices that the radar may be configured to detect existence of a preceding vehicle and to calculate the relative velocity to the preceding vehicle and the distance from the preceding vehicle.

The imaging sensor may include multiple imaging devices. For example, the multiple imaging devices may include four imaging devices including a front side imaging device, a rear side imaging device, a left side imaging device, and a right side imaging device (none shown). In this case, the front side imaging device is used for obtaining an image on the front side of the vehicle 100 among the circumference of the vehicle 100. The rear side imaging device is used for obtaining an image on the rear side of the vehicle 100. The left side imaging device is used for obtaining an image on the left side of the vehicle 100. The right side imaging device is used for obtaining an image on the right side of the vehicle 100. The circumference of the vehicle 100 denotes, for example, an area, such as a dozen-meter region, from the body of the vehicle 100.

The imaging sensor is configured to recognize a parking partition around the vehicle 100 and a closing line defining the parking partition, according to the images, such as the front side image, the rear side image, the left side image, and the right side image, obtained by the multiple the imaging devices. The imaging sensor is further configured to calculate the distance of the vehicle 100 from the recognized closing line and the inclination angle of the vehicle 100 relative to the recognized closing line. The imaging sensor outputs the obtained information to the vehicle automatic operation device 10. The closing line defining a parking partition denotes one of a pair of parallel closing lines, which are located on the left side of the vehicle 100 and the right side of the vehicle 100 and are opposed to each other when the vehicle 100 is parked at the parking partition. The distance from the closing line denotes the minimum distance from the center of the vehicle 100 to the closing line. The inclination angle of the vehicle 100 relative to the closing line denotes the angle between a straight line passing through the center of the vehicle 100 in the left-and-right direction and the closing line.

The imaging sensor recognizes an obstacle, such as a pedestrian, located around the vehicle 100 and calculates the distance from the recognized obstacle, according to the images, such as the front side image, the rear side image, the left side image, and the right side image, obtained by the multiple imaging devices. The imaging sensor outputs the obtained information to the vehicle automatic operation device 10.

The imaging sensor further outputs the images respectively obtained by the multiple the imaging devices to the vehicle automatic operation device 10. The vehicle automatic operation device 10 generates a bird's-eye view image according to the received images. The bird's-eye view image shows a circumference around the vehicle 100 viewed from an upper viewpoint of the vehicle 100. The vehicle automatic operation device 10 further indicates the generated bird's-eye view image in the indication region of the touch panel 41. In addition to the generated the bird's-eye view image, the vehicle automatic operation device 10 further indicates the front side image, the rear side image, the left side image, and the right side image in the indication region of the touch panel 41.

The traveling device group 70 is configured to include, for example, a brake control unit 71, an accelerator control unit 72, a steering control unit 73, and the like. The traveling device group 70 is connected to the vehicle automatic operation device 10. The brake control unit 71 is configured to include a brake actuator and an actuator control unit for controlling the brake actuator and automatically to slowdown the vehicle 100. The accelerator control unit 72 is configured to include a throttle actuator for controlling a throttle position and an actuator control unit for controlling the throttle actuator and automatically to accelerate the vehicle 100. The brake control unit 71 and the accelerator control unit 72 implement a control such that an actual vehicle speed of the vehicle 100 coincides with a target vehicle speed determined by the vehicle automatic operation device 10. The actual vehicle speed of the vehicle 100 may be obtained from a vehicle speed sensor (not shown) equipped in the vehicle 100 or may be calculated according to a movement of the vehicle on the road per unit time, which is obtained from a GPS signal and traffic information. The steering control unit 73 includes a steering wheel angle sensor and a steering wheel actuator. The steering wheel angle sensor detects a steering angle and outputs the detected steering angle. The steering wheel actuator rotates the steering wheel. The steering control unit 73 implements a control such that the actual steering angle detected by the steering wheel angle sensor coincides with the target steering angle determined by the vehicle automatic operation device 10.

The automatic operation control unit 14 of the vehicle automatic operation device 10 indicates the destination setting image in the indication region of the touch panel 41, after receiving the automatic traveling start instructions, after completion of the association of the consent information with the consent-input person information and storing of the associated information in the vehicle-side storage device 20, and on receiving the record end signal. The destination is set when the indicated destination setting image is touched. When the destination is set, the automatic operation control unit 14 searches for a path from the present position to the destination according to the set destination, the detected present position, and the map information. On completion of the search for the path, the automatic operation control unit 14 starts automatic travel of the vehicle 100 along the searched path in line with traffic regulations while avoiding collision with an obstacle.

Through the traveling in line with traffic regulations while avoiding collision with an obstacle, the automatic operation control unit 14 first determines whether the sensor 60 detects an obstacle. On determination that an obstacle is detected, the automatic operation control unit 14 causes the steering control unit 73 to control the steering angle of the vehicle 100 and causes the brake control unit 71 to slow down or stop the vehicle 100 so that the vehicle 100 does not make contact with the detected obstacle. When the automatic operation control unit 14 does not determine that an obstacle is detected, the automatic operation control unit 14 causes the brake control unit 71 and/or the accelerator control unit 72 to accelerate or slow down the vehicle 100, so that the vehicle speed of the vehicle 100 coincides with a legal speed of the traveling road.

On receiving the automatic parking start instructions, the automatic operation control unit 14 of the vehicle automatic operation device 10 indicates the bird's-eye view image in the indication region of the touch panel 41. In addition, the automatic operation control unit 14 indicates the target parking partition setting image for selecting the target parking partition among the parking partitions recognized in the bird's-eye view image. The target parking partition is set when the indicated the target parking partition setting image is touched. When the target parking partition is set, the automatic operation control unit 14 calculates the distance from the closing line, which defines the selected target parking partition, and the inclination angle of the vehicle 100 relative to the closing line. The automatic operation control unit 14 further causes the brake control unit 71, the accelerator control unit 72, and the steering control unit 73 to control the vehicle 100 such that the distance from the closing line coincides with a predetermined distance and the inclination angle becomes a predetermined angle. Specifically, the predetermined distance may be, for example, a distance calculated by adding 0.15 meter to a half length of the vehicle 100 in the left and right direction of the vehicle 100. The predetermined angle may be, for example, 0 degree.

On receiving the automatic tailing start instruction, the automatic operation control unit 14 of the vehicle automatic operation device 10 indicates the front image in the indication region of the touch panel 41. In addition, the automatic operation control unit 14 indicates the target preceding vehicle setting image for selecting a target preceding vehicle among recognized preceding vehicles in the front image. The target preceding vehicle is set when the indicated target preceding vehicle setting image is touched. When the target preceding vehicle is set, the automatic operation control unit 14 causes the brake control unit 71, the accelerator control unit 72, and the steering control unit 73 to control the vehicle 100 so that the vehicle 100 follows the target preceding vehicle and the distance between the vehicle 100 and the target preceding vehicle coincides with a predetermined distance. The predetermined distance may be selected from specific distances, such as 25 meters, 40 meters, and 50 meters, regardless of the vehicle speed. Alternatively, the predetermined distance may be set to be larger as the vehicle speed become higher.

When receiving the automatic braking start instruction, the automatic operation control unit 14 of the vehicle automatic operation device 10 causes the brake control unit 71 to brake the vehicle 100 so as not to make contact with an obstacle recognized by the sensor and so as to secure the distance greater than or equal to a predetermined distance, such as 5 metes, from an obstacle recognized by the sensor.

The automatic operation control unit 14 configured to implement the automatic traveling of the vehicle 100, the automatic parking of the vehicle 100, the automatic tailing of the vehicle 100, and the automatic braking of the vehicle 100 may function as an automatic operation control unit.

The automatic driving operation, such as the automatic traveling operation, the automatic parking operation, the automatic tailing operation, and the automatic braking operation, implemented by the vehicle automatic operation system 1 will be described with reference to FIGS. 3 to 6.

Figure 3:
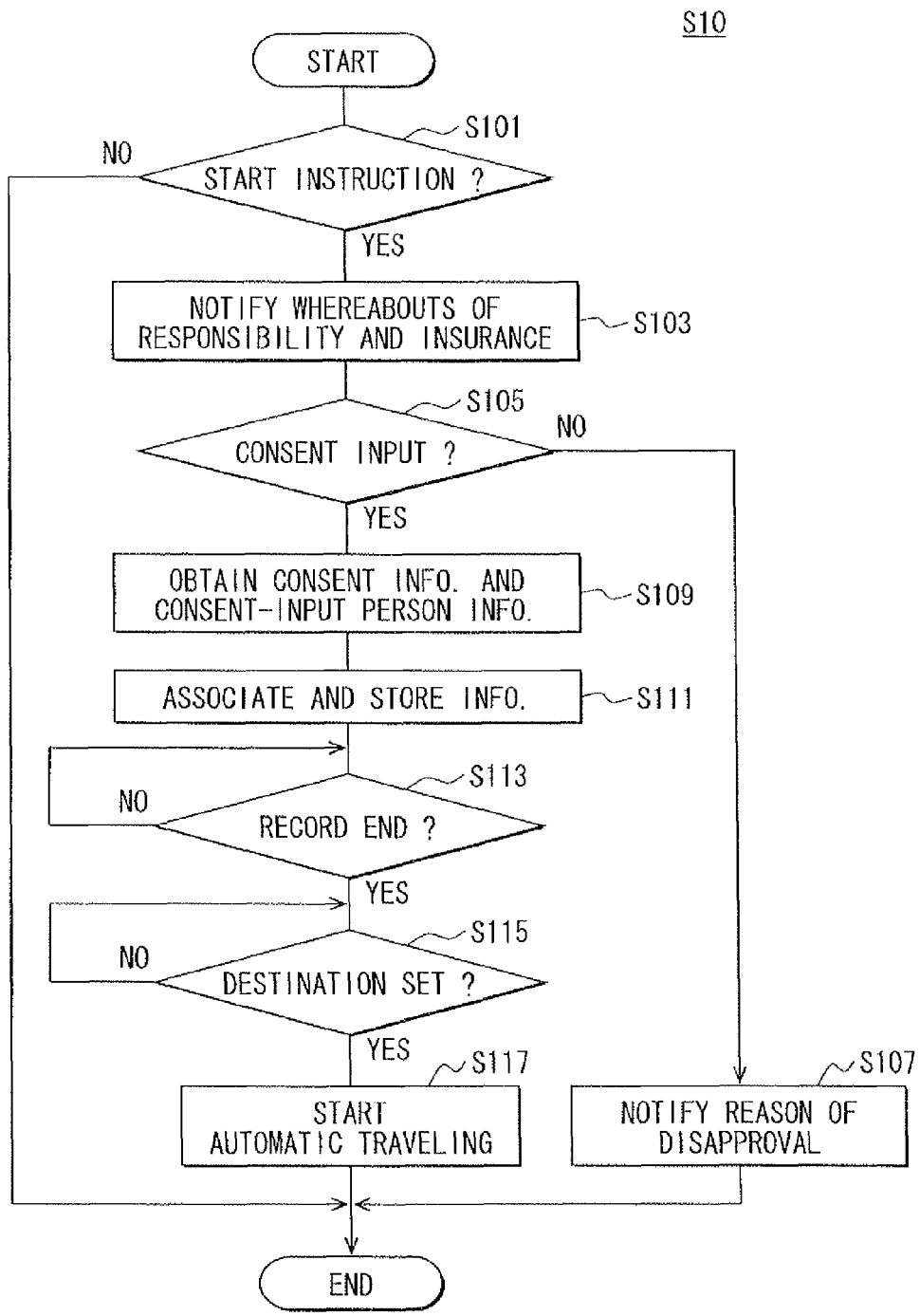
FIG. 3 is a flow chart showing an automatic traveling operation according to the first embodiment.

As shown in FIG. 3, when the automatic traveling operation S10 is started, the vehicle automatic operation device 10 implements a determination operation at step S101 and determines whether the vehicle automatic operation device 10 receives the automatic traveling start instruction. When the vehicle automatic operation device 10 determines that the vehicle automatic operation device 10 does not receive the automatic traveling start instruction (S101, No), the vehicle automatic operation device 10 terminates the automatic traveling operation S10. On the other hand, when the vehicle automatic operation device 10 determines to receive the automatic traveling start instruction, (S101, Yes), at subsequent step S103, the vehicle automatic operation device 10 notifies the whereabouts of the responsibility and the insurance content related to the automatic driving operation. Subsequently, the processing proceeds to a determination operation at step S105.

At step S105, the vehicle automatic operation device 10 determines whether the consent to the automatic driving operation is inputted. When the consent to the automatic driving operation is not inputted, (S105, No), the vehicle automatic operation device 10 notifies a reason for disapproval at subsequent step S107. Thus, the automatic traveling operation S10 is terminated. On the other hand, when receiving the consent to the automatic driving operation (S105, Yes), at subsequent step S109, the vehicle automatic operation device 10 obtains the consent information and the consent-input person information. At subsequent step S111, the vehicle automatic operation device 10 associates the obtained consent information with the obtained consent-input person information and stores the associated information in the vehicle-side storage device 20. Further, the vehicle automatic operation device 10 causes the vehicle-side wireless communication device 50 to transmit the associated information to the base station 200. In addition, the vehicle automatic operation device 10 causes the basestation-side storage device 202 to store the associated information. Thus, the processing proceeds to subsequent step S113.

In the determination operation at step S113, the vehicle automatic operation device 10 determines whether the vehicle automatic operation device 10 receives the record end signal from the base station 200 via the vehicle-side wireless communication device 50. When the vehicle automatic operation device 10 determines to receive the record end signal (S113, Yes), the processing proceeds to a determination operation at subsequent step S115. On the other hand, when the vehicle automatic operation device 10 determines not to receive the record end signal (S113, No), the vehicle automatic operation device 10 again executes the determination operation at step S113. In this way, the vehicle automatic operation device 10 repeatedly executes the determination operation at step S113 until receiving the record end signal.

The vehicle automatic operation device 10 according to the present embodiment may not check whether the vehicle-side storage device 20 completes storing of the consent information and the consent-input person information being associated. This is because the vehicle-side storage device 20 is equipped in the vehicle 100 similarly to the vehicle automatic operation device 10, and connected with the vehicle automatic operation device 10 via wired communication. Therefore, the vehicle-side storage device 20 can store the information further steadily in a short time, as compared with the basestation-side storage device 202. Nevertheless, it is noted that the vehicle automatic operation device 10 may check whether the vehicle-side storage device 20 completes the storing of the information.

In the determination operation at step S105, the vehicle automatic operation device 10 determines whether the destination is set. When the vehicle automatic operation device 10 determines that the destination is set (S115, Yes), the processing proceeds to subsequent step S117. On the other hand, when the vehicle automatic operation device 10 determines that the destination is not set (S115, No), the vehicle automatic operation device 10 again executes the determination operation at step S115. In this way, the vehicle automatic operation device 10 repeatedly executes the determination operation at step S115 until the destination is set.

At step S117, the vehicle automatic operation device 10 searches for the path from the present position to the destination. Further, the vehicle automatic operation device 10 travels the vehicle 100 automatically along the searched path in line with the traffic regulations, while avoiding contact with an obstacle.

Figure 4:
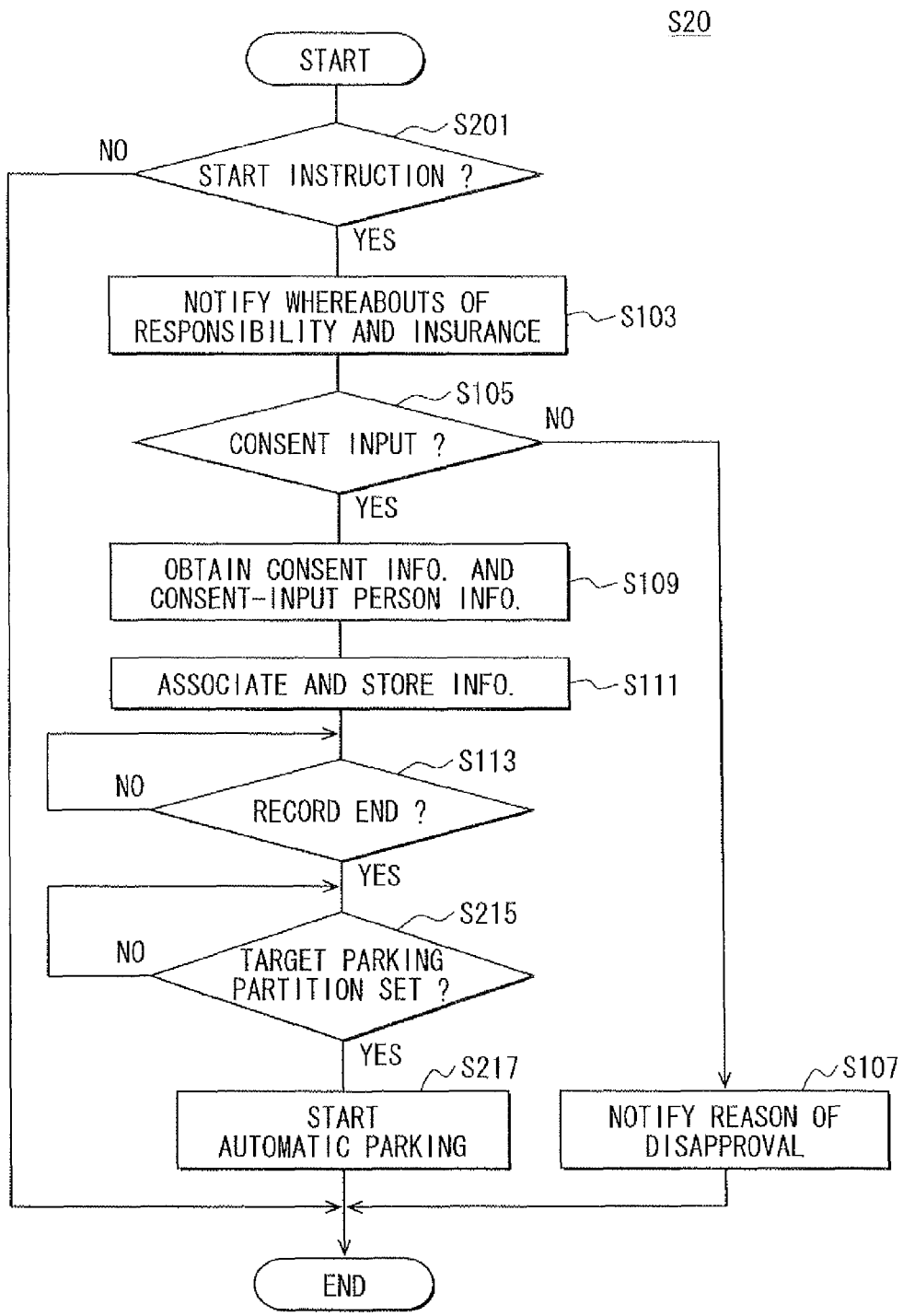
FIG. 4 is a flow chart showing an automatic parking operation according to the first embodiment.

FIG. 4 shows a processing of the automatic parking operation S20. The processing of the automatic parking operation S20 is similar to the automatic traveling operation S10 in FIG. 3. Therefore, processings different from those of the automatic traveling operation S10 will be described.

When the automatic parking operation S20 is started, the vehicle automatic operation device 10 implements a determination operation at step S201 and determines whether the vehicle automatic operation device 10 receives the automatic parking start instruction. When the vehicle automatic operation device 10 determines to receive the automatic parking start instruction (S201, Yes), the processings at step S103 and subsequent steps are executed.

In the determination operation at step S215, the vehicle automatic operation device 10 determines whether the target parking partition is set. When the vehicle automatic operation device 10 determines that the target parking partition is set (S215, Yes), the processing proceeds to subsequent step S217. At 5217, the vehicle automatic operation device 10 automatically parks the vehicle 100 at the target parking partition. On the other hand, when the vehicle automatic operation device 10 determines that the target parking partition is not set (S215, No), the vehicle automatic operation device 10 again executes the determination operation at step S215. In this way, the vehicle automatic operation device 10 repeatedly executes the determination operation at step S215 until the target parking partition is set.

At step S217, the vehicle automatic operation device 10 automatically parks the vehicle 100 at the target parking partition.

Figure 5:
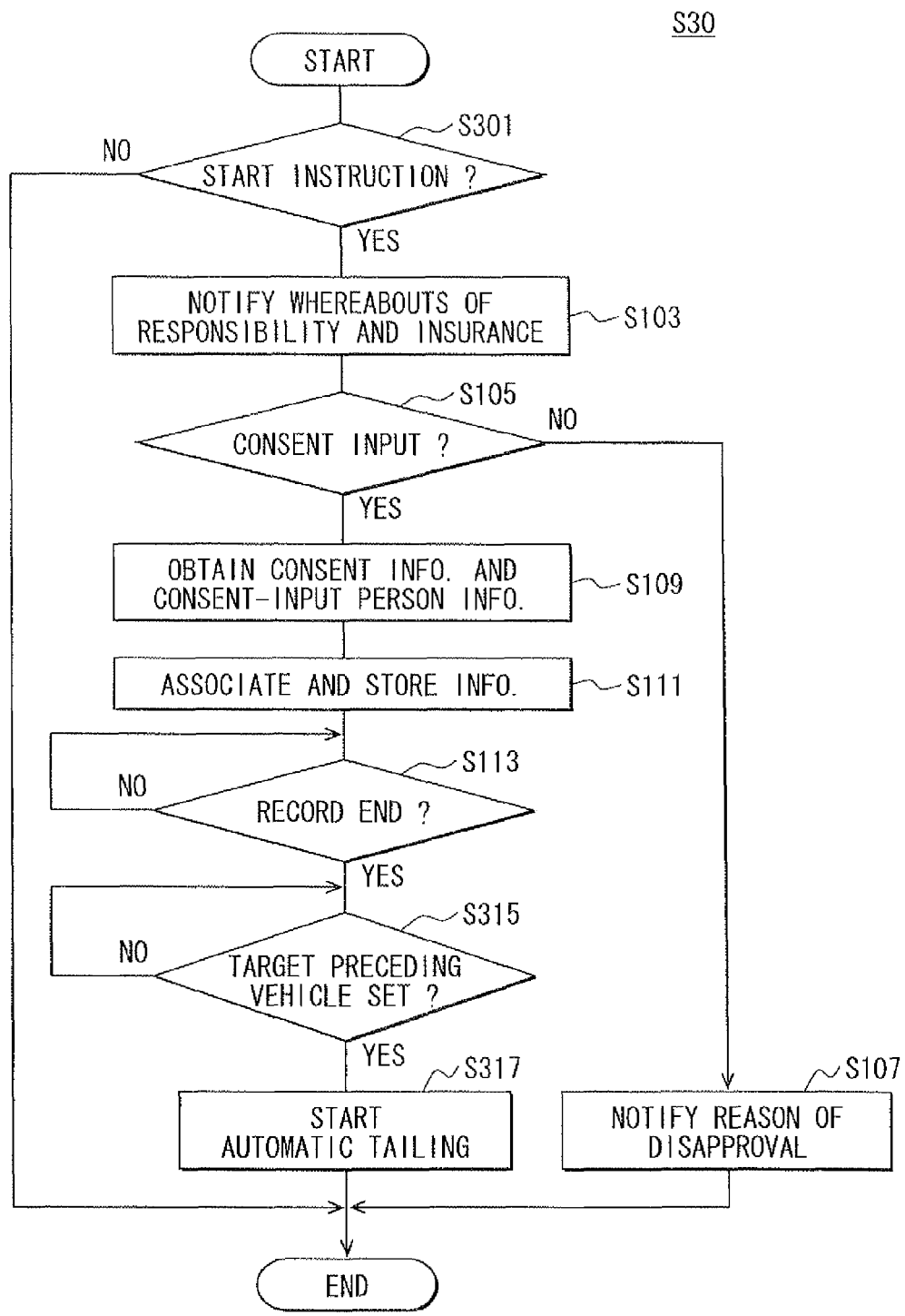
FIG. 5 is a flow chart showing an automatic tailing operation according to the first embodiment.

FIG. 5 shows a procedure of the automatic tailing operation S30. The processing of the automatic tailing operation 830 is similar to the automatic traveling operation S10 in FIG. 3. Therefore, processings different from those of the automatic traveling operation 810 will be described.

When the automatic tailing operation S30 is started, the vehicle automatic operation device 10 implements a determination operation at step S301 and determines whether the vehicle automatic operation device 10 receives the automatic tailing start instruction. When the vehicle automatic operation device 10 determines to receive the automatic tailing start instruction (S301, Yes), the processings at step S103 and subsequent steps are executed.

In the determination operation at step S315, the vehicle automatic operation device 10 determines whether the target preceding vehicle is set. When the vehicle automatic operation device 10 determines that the target preceding vehicle is set (S315, Yes), the processing proceeds to subsequent step S317. At S317, the vehicle automatic operation device 10 cause the vehicle 100 automatically to follow the target preceding vehicle. On the other hand, when the vehicle automatic operation device 10 determines that the target preceding vehicle is not set (S315, No), the vehicle automatic operation device 10 again executes the determination operation at step S315. In this way, the vehicle automatic operation device 10 repeatedly executes the determination operation at step S315 until the target preceding vehicle is set.

At step S317, the vehicle automatic operation device 10 causes the vehicle 100 automatically to follow the target preceding vehicle.

Figure 6:
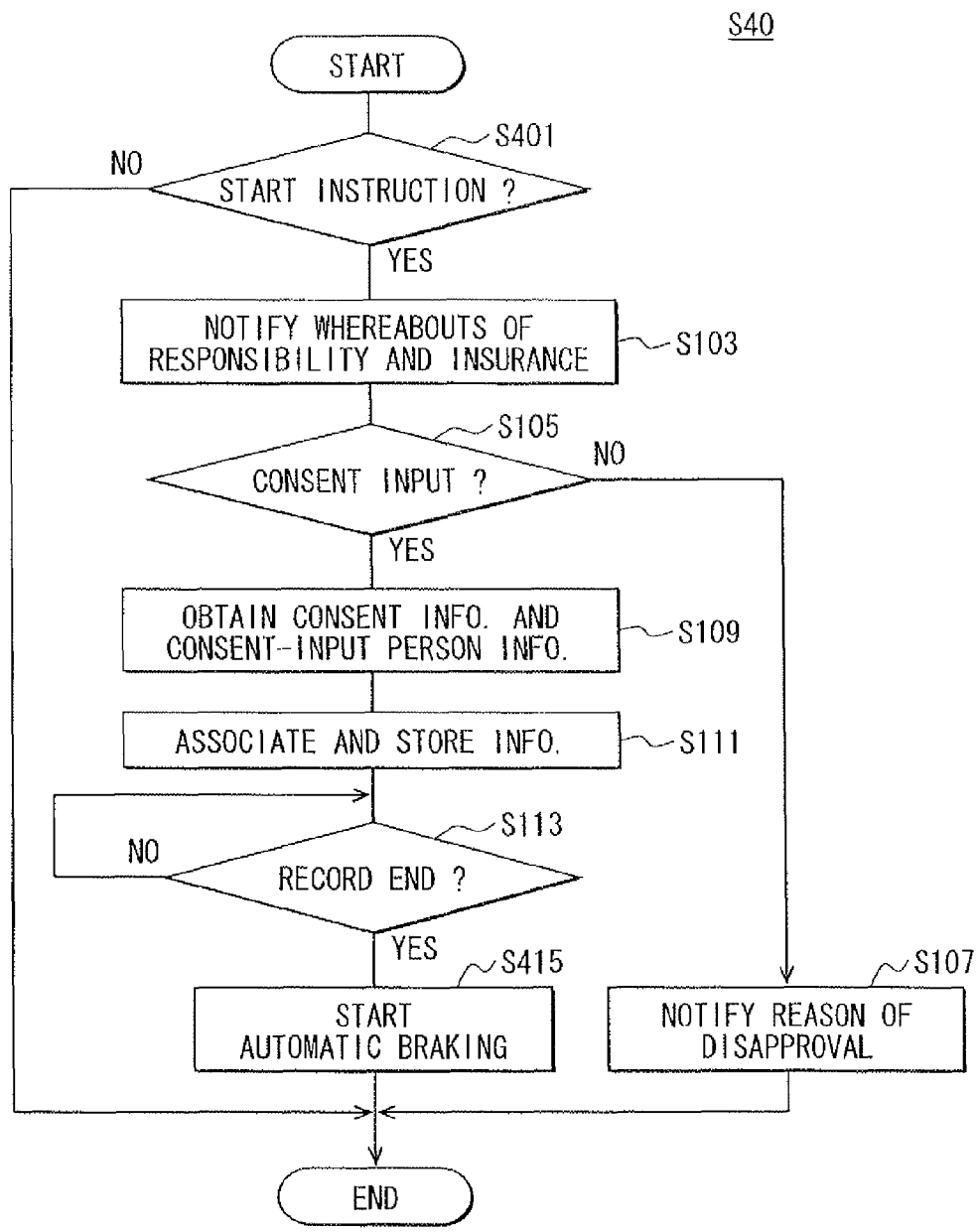
FIG. 6 is a flow chart showing an automatic braking operation according to the first embodiment.

FIG. 6 shows a procedure of the automatic braking operation S40. The processing of the automatic braking operation S40 is similar to the automatic traveling operation S10 in FIG. 3. Therefore, processings different from those of the automatic traveling operation S10 will be described.

When the automatic braking operation S40 is started, the vehicle automatic operation device 10 implements a determination operation at step S401 and determines whether the vehicle automatic operation device 10 receives the automatic braking start instruction. When the vehicle automatic operation device 10 determines to receive the automatic braking start instruction (S401, Yes), the processings at step S103 and subsequent steps are executed.

In the determination operation at step S113, the vehicle automatic operation device 10 determines whether the vehicle automatic operation device 10 receives the record end signal from the base station 200 via the vehicle-side wireless communication device 50. When the vehicle automatic operation device 10 determines to receive the record end signal (S113, Yes), the processing proceeds to subsequent step S415 where the vehicle automatic operation device 10 starts the automatic braking operation. On the other hand, when the vehicle automatic operation device 10 determines not to receive the record end signal (S113, No), the vehicle automatic operation device 10 again executes the determination operation at step S113. In this way, the vehicle automatic operation device 10 repeatedly executes the determination operation at step S113 until receiving the record end signal.

At step S415, the vehicle automatic operation device 10 automatically brakes the vehicle 100 not to make contact with an obstacle.

The vehicle automatic operation device 10 according to the first embodiment as described above notifies that the consent input person has the responsibility related to the automatic driving operation of the vehicle 100, before starting the automatic driving operation of the vehicle 100. The vehicle automatic operation device 10 further obtains the consent information and the consent-input person information, after notifying the whereabouts of the responsibility related to the automatic driving operation. The vehicle automatic operation device 10 further associates the obtained consent information and the obtained consent-input person information. The vehicle automatic operation device 10 further causes both the vehicle-side storage device 20 and the basestation-side storage device 202 to store (record) the consent information and the obtained consent-input person information being associated to each other. Thus, the vehicle automatic operation device 10 starts the automatic driving operation, after associating the consent information with consent-input person information and completing the storing of the associated information in the vehicle-side storage device 20, on receiving the record end signal. According to the present configuration, the consent information and the consent-input person information are associated and stored in the vehicle-side storage device 20 and the basestation-side storage device 202. Thereby, the consent input person can be identified according to the consent information and the consent-input person information in the case where the automatic driving operation of the vehicle is started and thereafter when an accident occurs during the automatic driving operation. Thus, dissimilarly to the art of JP-A-3-142507, in which the operator (consent input person) cannot be identified, the present configuration of the vehicle automatic operation device 10 enables clarifying of the whereabouts of the responsibility securely when an accident occurs during the automatic driving operation.

According to the first embodiment, when the consent to the automatic driving operation of the vehicle 100 is inputted into the vehicle automatic operation device 10, the consent-input person information acquisition unit 12 causes the vehicle interior imaging device 43 to obtain the image of the driver's face thereby to obtain the facial image information of the consent input person as the consent-input person information. It is noted that the information obtained as the consent-input person information is not limited to the facial image information of the consent input person. Alternatively, for example, the consent-input person information acquisition unit 12 may cause the vehicle interior imaging device 43 to obtain an image of a driver's license of the driver thereby to obtain driver's license image information of the consent input person as the consent-input person information. Alternatively, for example, the consent-input person information acquisition unit 12 may cause the vehicle interior imaging device 43 to obtain an image of a fingerprint of the driver thereby to obtain fingerprint image information of the consent input person as the consent-input person information. The image information is not limited to the facial image information, the driver's license image information, and the fingerprint image information. For example, the consent input person may be caused to input personal information, such as the name, the birth date, and the home address, into the touch panel 41 thereby to obtain the inputted personal information as the consent-input person information. The consent input person can be identified according to various information, such as the driver's license image information, the fingerprint image information, and the personal information.

Second Embodiment

As follows, the vehicle automatic operation system 2 according to the present second embodiment will be described with reference to FIGS. 7 to 10. A vehicle automatic operation device 10a and the vehicle automatic operation system 2 according to the second embodiment also have a configuration similar to that of the vehicle automatic operation system 1 according to the first embodiment. In the following description, different portions from those of the first embodiment will be described, and repeated explanations will be omitted.

Figure 7:
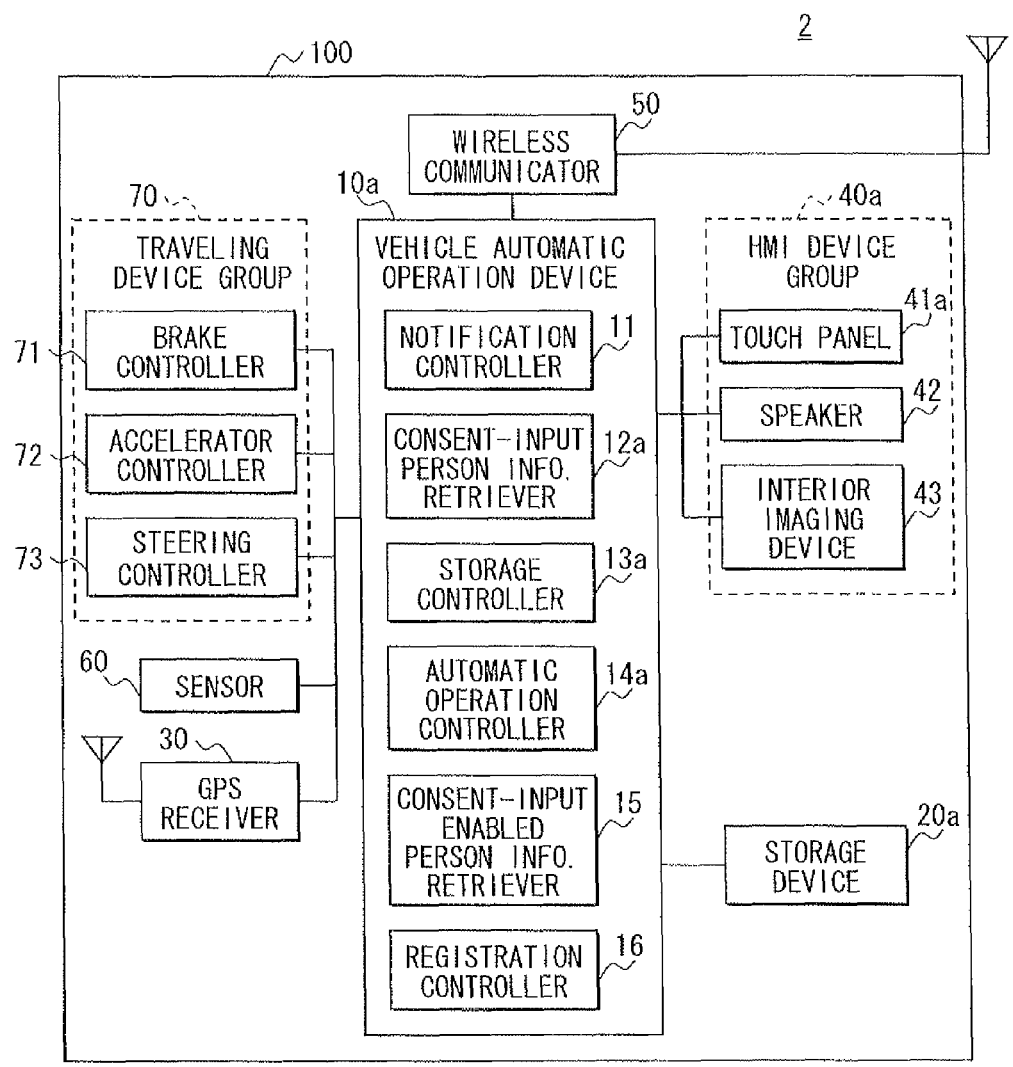
FIG. 7 is a block diagram showing a vehicle automatic operation system according to the second embodiment.

As shown in FIG. 7, the vehicle automatic operation device 10a includes functional units for implementing various functions, such as the notification control unit 11, a consent-input person information acquisition unit 12a, a storage control unit 13a, an automatic operation control unit 14a, a consent-input enabled person information acquisition unit 15, and a registration control unit 16.

A vehicle-side storage device 20a according to the present embodiment stores various data such as a consent-input enabled person information input image, a consent-input person information input image, an operational mode switching image, and the like. The consent-input enabled person information input image is used for inputting the consent-input enabled person information on a consent-input enabled person who is effective to input the consent. The consent-input person information input image is used for inputting the consent-input person information. The operational mode switching image is used for switching operational modes between a register mode and a consent input mode. The register mode is used for registering the consent-input enabled person. The consent input mode is used for inputting the consent. The vehicle-side storage device 20a may function as a consent-input enabled person information storage unit.

The vehicle automatic operation device 10a reads the operational mode switching image from a vehicle-side storage device 21 and indicates the read operational mode switching image in the indication region of the touch panel 41. The vehicle automatic operation device 10a operates in the operational mode of either the register mode or the consent input mode when the operational mode switching image is touched.

After the operation in the consent input mode is started, the consent-input person information acquisition unit 12a reads the consent-input person information input image from the vehicle-side storage device 20a when determining that the consent input operation image indicated in the indication region of the touch panel 41 is touched. That is, the consent-input person information acquisition unit 12a reads the consent-input person information input image when the consent to the automatic driving operation of the vehicle 100 is inputted into the vehicle automatic operation device 10. Thus, the consent-input person information acquisition unit 12a indicates the image in the indication region of the touch panel 41. When the consent input person touches the image, the consent-input person information acquisition unit 12a obtains the consent-input person information. In the present embodiment, personal information on the consent input person, such as the name, the birth date, the home address, and the like, and/or a password including a character string of a predetermined number, such as eight characters, is employed as the consent-input person information. The personal information and the password of the consent input person may be equivalent to consent-input person information.

After the operation in the register mode is started, the consent-input enabled person information acquisition unit 15 reads the consent-input enabled person information input image from the vehicle-side storage device 20a and indicates the image in the indication region of the touch panel 41. When the consent-input enabled person touches the image, the consent-input enabled person information acquisition unit 15 obtains the consent-input enabled person information. In the present embodiment, personal information on the consent-input enabled person, such as the name, the birth date, the home address, and the like, and/or a password including a character string of a predetermined number, such as eight characters, is employed as the consent-input enabled person information. The personal information and the password of the consent-input enabled person may be equivalent to the consent-input enabled person information. In the present embodiment, the consent-input enabled person information acquisition unit 15 obtains, as the consent-input enabled person information, information of the same kind as the information, such as the personal information and the password, which the consent-input person information acquisition unit 12a obtains as the consent-input person information. The consent-input enabled person information acquisition unit 15, the touch panel 41 and the like may function as a consent-input enabled person information acquisition unit.

After the operation in the register mode is started and when obtaining the consent-input enabled person information, the registration control unit 16 writes (registers) the obtained consent-input enabled person information in the vehicle-side storage device 20a. The registration control unit 16 may function as a registration unit.

After the operation in the consent input mode is started and when obtaining the consent-input person information, the storing control unit 13a and the automatic operation control unit 14a of the vehicle automatic operation device 10a determines whether the consent input person coincides with the consent-input enabled person according to the obtained the consent-input person information and the consent-input enabled person information. Specifically, the storing control unit 13a determines whether the personal information and the password of the consent input person respectively coincide with the personal information (or consent information) and the password of the consent-input enabled person.

When it is determined that the consent input person coincides with the consent-input enabled person, the storing control unit 13a associates the consent information with the consent-input person information and causes both the vehicle-side storage device 20a and the basestation-side storage device 202 to store (record) the associated information. On the other hand, when it is determined that the consent input person does not coincide with the consent-input enabled person, the storing control unit 13a does not store the information.

When it is determined that the consent input person coincides with the consent-input enabled person, the automatic operation control unit 14a starts the automatic driving operation of the vehicle 100. On the other hand, when it is determined that the consent input person does not coincide with the consent-input enabled person, the automatic operation control unit 14a does not start the automatic driving operation of the vehicle 100.

The automatic driving operation, such as the automatic traveling operation, the automatic parking operation, the automatic tailing operation, and the automatic braking operation, implemented by the vehicle automatic operation system 2 will be described with reference to FIGS. 8 to 11. It is supposed that the vehicle automatic operation device 10a operates in the consent input mode.

Figure 8:
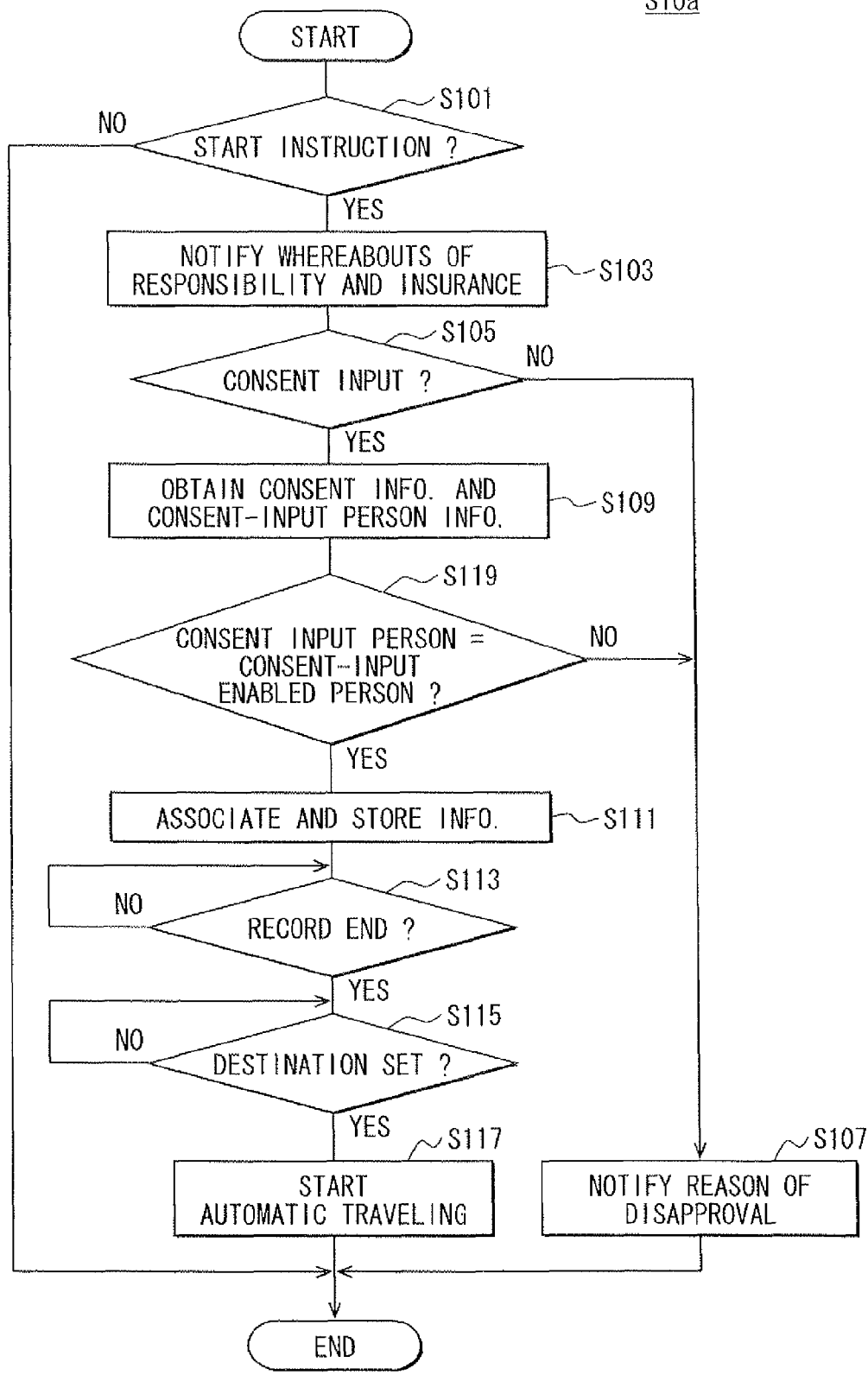
FIG. 8 is a flow chart showing an automatic traveling operation according to the second embodiment.

FIG. 8 shows a processing of the automatic parking operation S10a. The processing of the automatic traveling operation S10a is similar to the automatic traveling operation S10 in FIG. 3. Therefore, processings different from those of the automatic traveling operation S10 will be described.

In the determination operation at step S119, the vehicle automatic operation device 10a determines whether the consent input person coincides with the consent-input enabled person. When the vehicle automatic operation device 10a determines that the consent input person coincides with the consent-input enabled person (S119, Yes), the processing proceeds to subsequent step S111 where the vehicle automatic operation device 10a associates the consent information with the consent-input person information and stores (records) the associated information. On the other hand, when the vehicle automatic operation device 10a determines that the consent input person does not coincide with the consent-input enabled person (S119, No), the processing proceeds to subsequent step S107.

Figure 9:
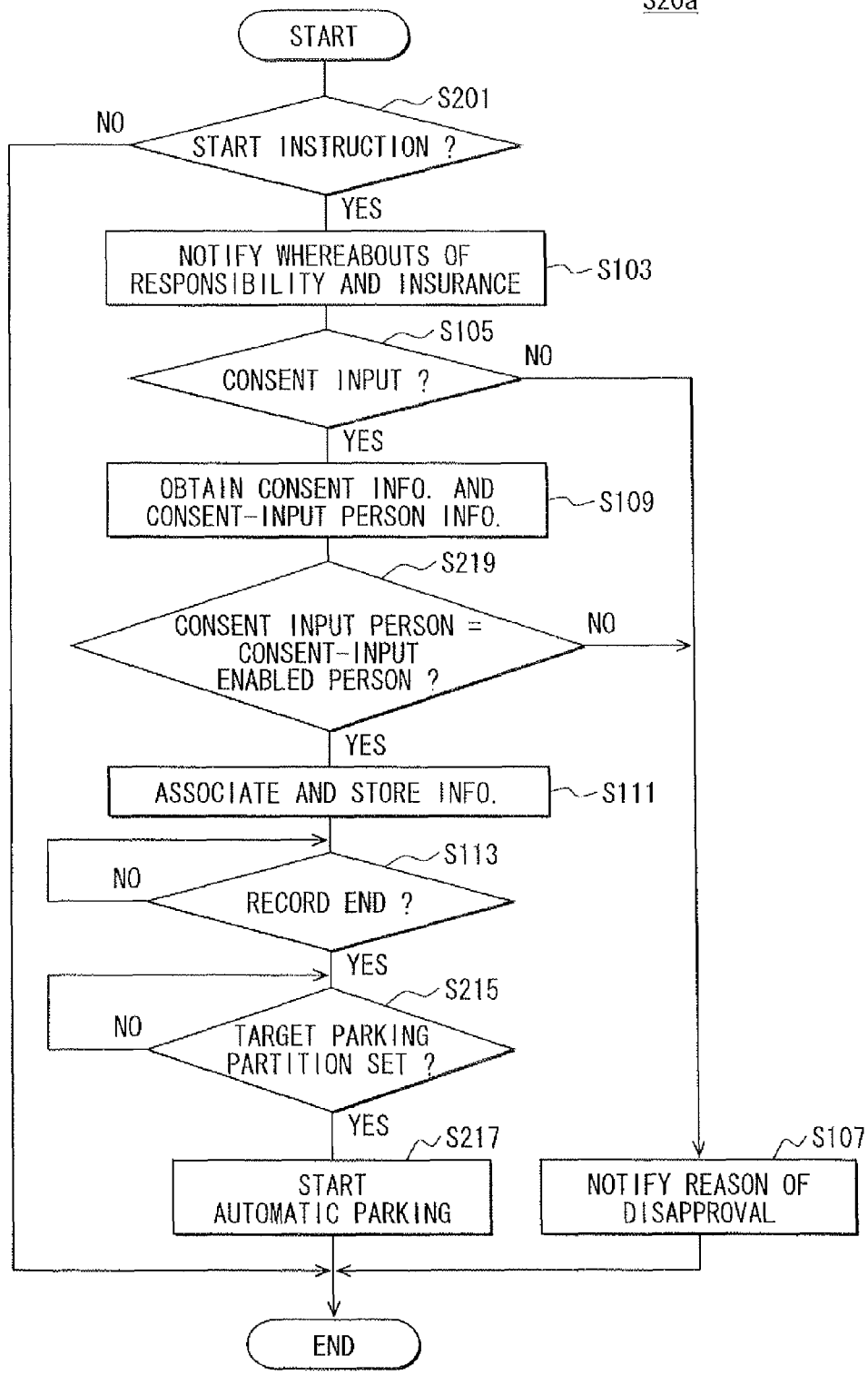
FIG. 9 is a flow chart showing an automatic parking operation according to the second embodiment.

FIG. 9 shows a processing of the automatic parking operation S20a. The processing of the automatic parking operation S20a is similar to the automatic parking operation S20 in FIG. 4. Therefore, processings different from those of the automatic parking operation S20 will be described.

In the determination operation at step S219, the vehicle automatic operation device 10a determines whether the consent input person coincides with the consent-input enabled person. When the vehicle automatic operation device 10a determines that the consent input person coincides with the consent-input enabled person (S219, Yes), the processing proceeds to subsequent step S111 where the vehicle automatic operation device 10a associates the consent information with the consent-input person information and stores (records) the associated information. On the other hand, when the vehicle automatic operation device 10a determines that the consent input person does not coincide with the consent-input enabled person (S219, No), the processing proceeds to subsequent step S107.

Figure 10:
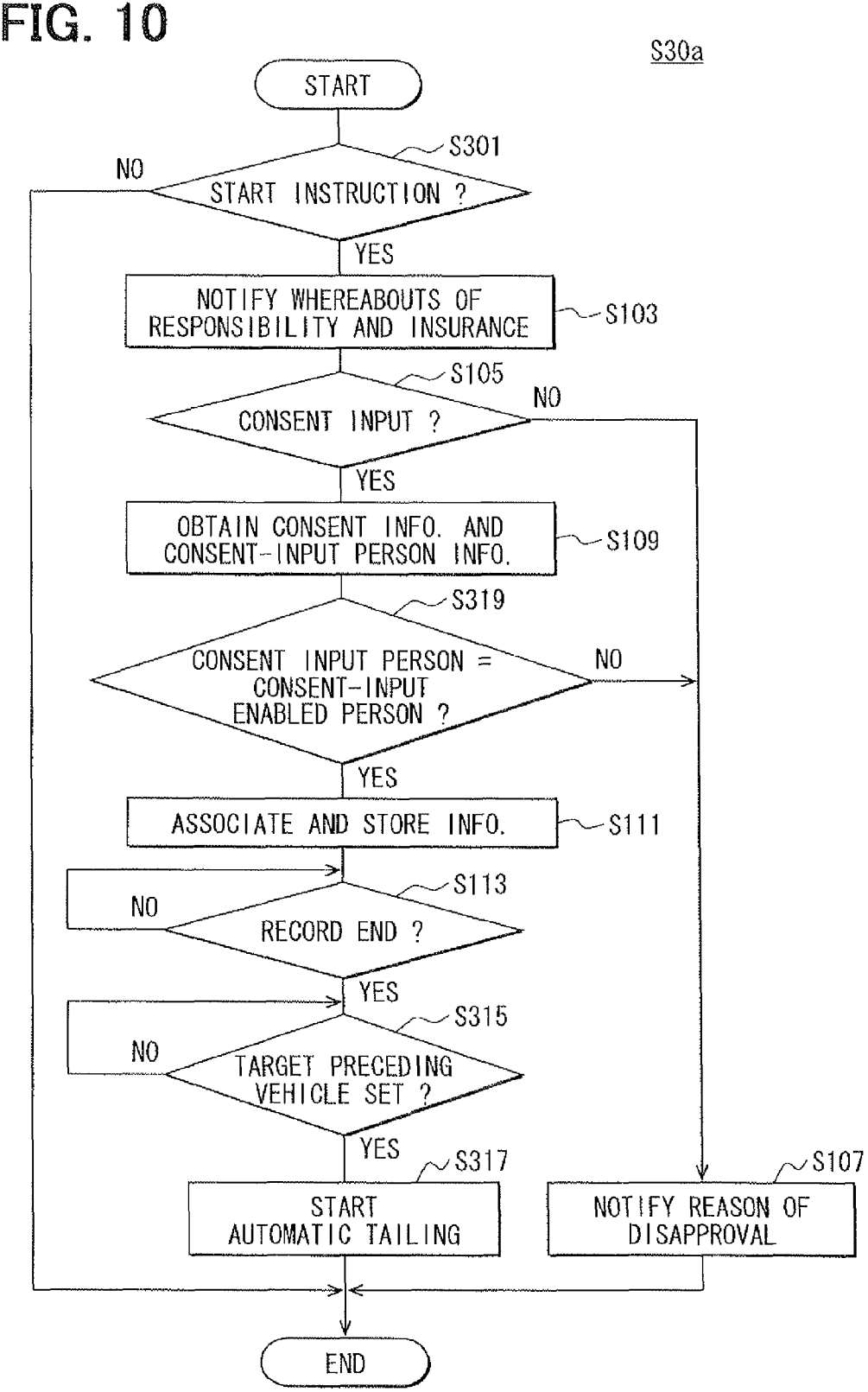
FIG. 10 is a flow chart showing an automatic tailing operation according to the second embodiment.

FIG. 10 shows a processing of the automatic tailing operation S30a. The processing of the automatic tailing operation S30a is similar to the automatic tailing operation S30 in FIG. 5. Therefore, processings different from those of the automatic tailing operation S30 will be described.

In the determination operation at step S319, the vehicle automatic operation device 10a determines whether the consent input person coincides with the consent-input enabled person. When the vehicle automatic operation device 10a determines that the consent input person coincides with the consent-input enabled person (S319, Yes), the processing proceeds to subsequent step S111 where the vehicle automatic operation device 10a associates the consent information with the consent-input person information and stores (records) the associated information. On the other hand, when the vehicle automatic operation device 10a determines that the consent input person does not coincide with the consent-input enabled person (S319, No), the processing proceeds to subsequent step S107.

Figure 11:
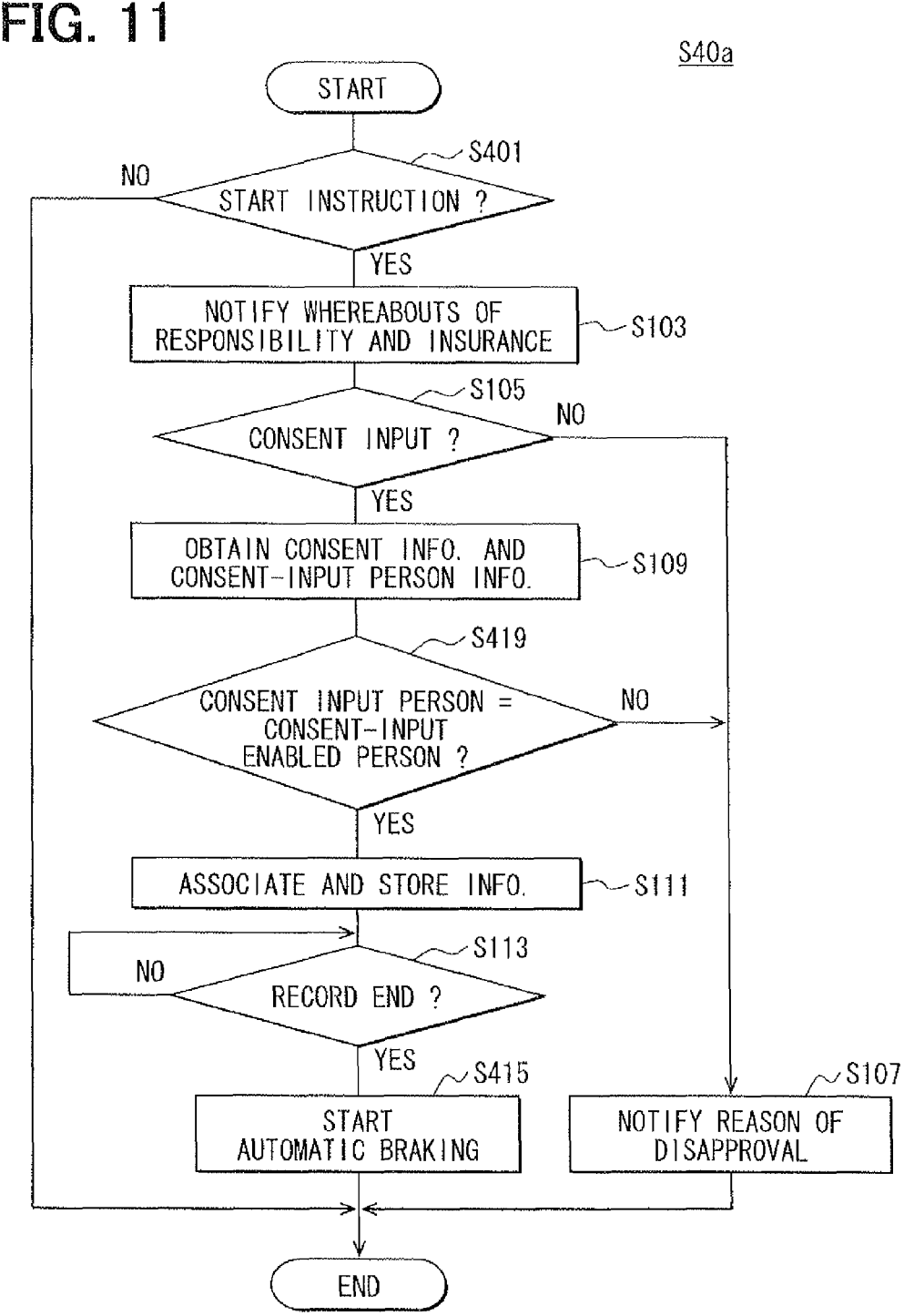
FIG. 11 is a flow chart showing an automatic braking operation according to the second embodiment.

FIG. 11 shows a processing of the automatic braking operation S40a. The processing of the automatic braking operation 840a is similar to the automatic braking operation S40 in FIG. 6. Therefore, processings different from those of the automatic braking operation S40 will be described.

In the determination operation at step S419, the vehicle automatic operation device 10a determines whether the consent input person coincides with the consent-input enabled person. When the vehicle automatic operation device 10a determines that the consent input person coincides with the consent-input enabled person (S419, Yes), the processing proceeds to subsequent step S111 where the vehicle automatic operation device 10a associates the consent information with the consent-input person information and stores (records) the associated information. On the other hand, when the vehicle automatic operation device 10a determines that the consent input person does not coincide with the consent-input enabled person (S419, No), the processing proceeds to subsequent step S107.

After the operation in the register mode is started and when obtaining the consent-input enabled person information, the vehicle automatic operation device 10a writes (registers) the obtained consent-input enabled person information in the vehicle-side storage device 20a. After the operation in the consent input mode is started and when obtaining the consent-input person information, the vehicle automatic operation device 10a determines whether the consent input person coincides with the consent-input enabled person according to the obtained the consent-input person information and the consent-input enabled person information. When determining that the consent input person coincides with the consent-input enabled person, the vehicle automatic operation device 10a associates the consent information with the consent-input person information and causes both the vehicle-side storage device 20a and the basestation-side storage device 202 to store (record) the associated information. In this case, the vehicle automatic operation device 10a further starts the automatic driving operation of the vehicle 100. On the other hand, when determining that the consent input person does not coincide with the consent-input enabled person, the vehicle automatic operation device 10a does not store the information. In this case, the vehicle automatic operation device 10a does not start the automatic driving operation of the vehicle 100. In the present configuration, when the operator is not the consent-input enabled person registered in the vehicle-side storage device 20a, the automatic driving operation of the vehicle 100 is not started even if the operator inputs the consent into the touch panel 41. Thus, an accident does not occur during the automatic driving operation of the vehicle 100. In addition, when the automatic driving operation of the vehicle 100 is started and when an accident occurs during the automatic driving operation of the vehicle 100, the consent input person is limited to the consent-input enabled person registered in the vehicle-side storage device 20a. Therefore, the consent input person can be quickly identified.

According to the second embodiment, when the consent to the automatic driving operation of the vehicle 100 is inputted into the vehicle automatic operation device 10a, the consent-input person information acquisition unit 12a obtains the personal information and the password of the consent input person as the consent-input person information according to the touch of the touch panel 41. It is noted that the information obtained as the consent-input person information is not limited to the personal information and the password of the consent input person. Alternatively, when the consent to the automatic driving operation of the vehicle 100 is inputted into the vehicle automatic operation device 10a, the consent-input person information acquisition unit 12a may cause the vehicle interior imaging device 43 to obtain the image of the driver's face thereby to obtain the facial image information of the consent input person as the consent-input person information. Alternatively, the consent-input person information acquisition unit 12a may cause the vehicle interior imaging device 43 to obtain an image of a driver's license of the driver thereby to obtain driver's license image information of the consent input person as the consent-input person information. Alternatively, for example, the consent-input person information acquisition unit 12a may cause the vehicle interior imaging device 43 to obtain an image of a fingerprint of the driver thereby to obtain fingerprint image information of the consent input person as the consent-input person information.

In the second embodiment, the consent-input enabled person information acquisition unit 15 obtains, as the consent-input enabled person information, information of the same kind as the information, which the consent-input person information acquisition unit 12a obtains as the consent-input person information. Therefore, when the consent-input person information acquisition unit 12a obtains the facial image information of the consent input person as the consent-input person information, the consent-input enabled person information acquisition unit 15 obtains the facial image information of the consent-input enabled person as the consent-input enabled person information. When the consent-input person information acquisition unit 12a obtains the driver's license image information of the consent input person as the consent-input person information, the consent-input enabled person information acquisition unit 15 obtains the driver's license image information of the consent-input enabled person as the consent-input enabled person information. When the consent-input person information acquisition unit 12a obtains the fingerprint image information of the consent input person as the consent-input person information, the consent-input enabled person information acquisition unit 15 obtains the fingerprint image information of the consent-input enabled person as the consent-input enabled person information.

In the second embodiment, the consent-input enabled person information acquisition unit 15 obtains, as the consent-input enabled person information, the information of the same kind as the information, which the consent-input person information acquisition unit 12a obtains as the consent-input person information. It is noted that the consent-input enabled person information is not limit to the information of the same kind as the consent-input person information. It may suffice to determine whether the consent input person coincides with the consent-input enabled person according to the consent-input person information and the consent-input enabled person information. Therefore, the consent-input enabled person information acquisition unit 15 may obtain, as consent-input enabled person information, information of different kind from the information, which the consent-input person information acquisition unit 12a obtains as the consent-input person information.

In the second embodiment, the vehicle automatic operation device 10a stores (registers) the consent-input enabled person information in the vehicle-side storage device 20a. It is noted that the storing configuration is not limited to this. The vehicle automatic operation device 10a may cause the vehicle-side wireless communication device 50 to store (register) the consent-input enabled person information in the basestation-side storage device 202. In this case, the vehicle automatic operation device 10a may determine whether the consent input person corresponds to the consent-input enabled person by using the vehicle-side wireless communication device 50.

Third Embodiment

Next, the third embodiment of the present invention will be described. The present third embodiment is related to a vehicle remote operation system configured to implement a remote operation of a vehicle without manipulation of an occupant. The vehicle remote driving operation system according to the third embodiment is configured to include the vehicle 100 shown in FIG. 12, the base station 200 shown in FIG. 13, a remote operation terminal 300 shown in FIG. 14, and the like.

Figure 12:
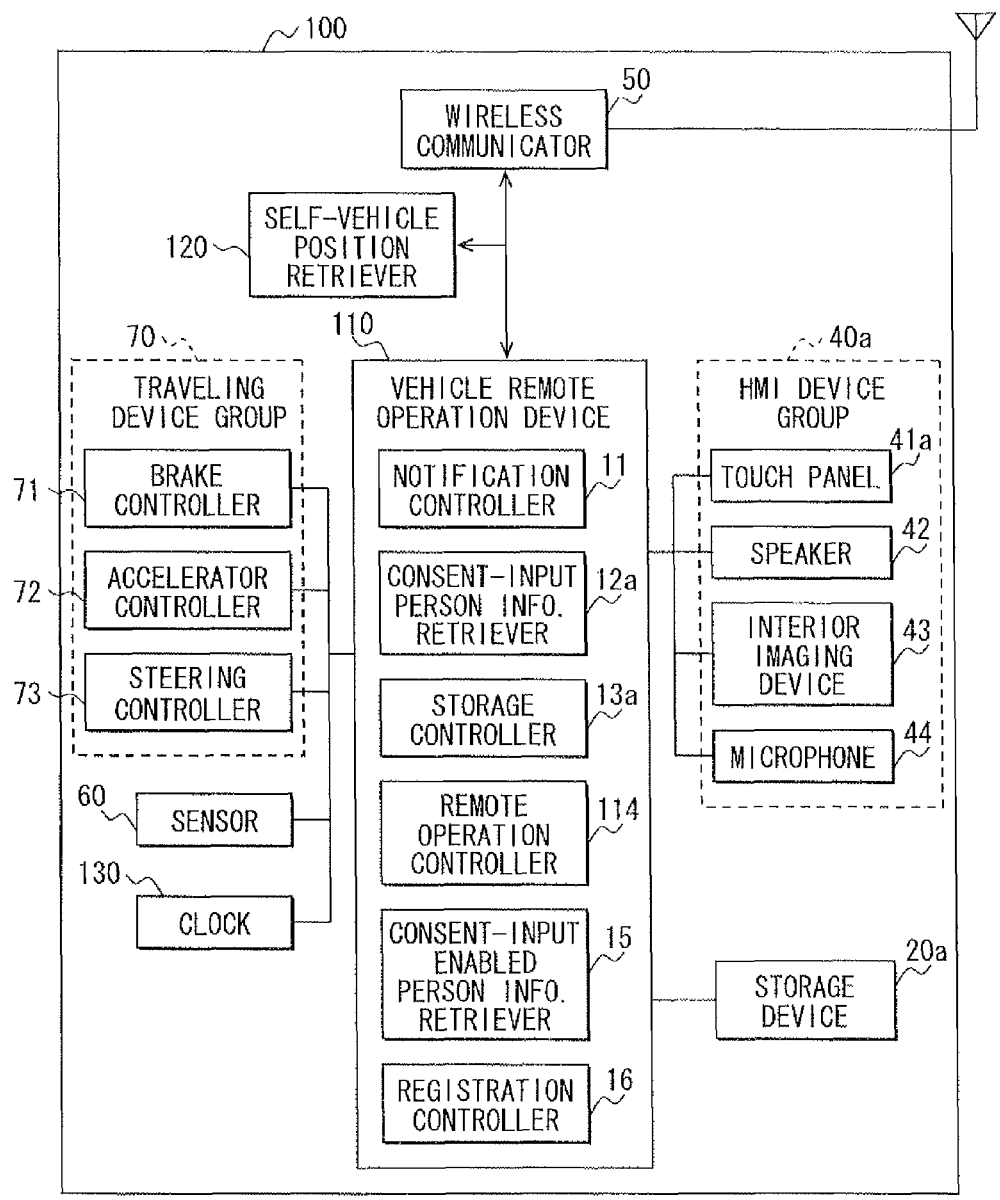
FIG. 12 is a block diagram showing a vehicle of a vehicle automatic operation system according to the third embodiment.

First, the configuration of the vehicle 100 according to the third embodiment will be described with reference to FIG. 12. The above-described second embodiment is related to the automatic operation system. To the contrary, the third embodiment is related to the remote operation system. Nevertheless, the configuration of the vehicle 100 is similar to that of the second embodiment. The vehicle 100 according to the third embodiment includes a vehicle remote operation device 110 and a self-vehicle position acquisition unit 120, instead of the vehicle automatic operation device 10 and the GPS receiver 30 in the second embodiment. It is noted that these device and unit have functions similar to those of the vehicle automatic operation device 10 and the GPS receiver 30 in the second embodiment. The vehicle 100 according to the third embodiment includes a clock 130. The HMI device group 40 according to the third embodiment further includes a microphone 44 and may function as a remote operation request unit. First, the function of the HMI device group 40 (remote operation request unit) will be described.

The microphone 44 is activated when the touch panel 41 or another switch device (not shown) is manipulated to implement a remote replacement operation request start operation. Thereafter, remote talk is enabled with the base station 200 via the vehicle-side wireless communication device 50. A wireless communication device for remote talk may be provided in addition to the vehicle-side wireless communication device 50. After the remote talk is enabled with the base station 200, a remote replacement operation is requested by the remote talk to a person, who implements the remote replacement operation in the base station 200. The destination is also transmitted in the request, in addition to the request of the remote replacement operation. According to the present embodiment, the remote replacement operation can be also requested by a switch device operation, in addition to the request by the remote talk. In the case of the request implemented by the switch device operation, the destination is specified by the switch device operation. In the case of the request implemented by the remote talk, a voice is converted into an electric signal to generate a remote operation request signal. Alternatively, in the case of the request implemented by the switch device operation, the switch device operation generates a remote driving operation request signal.

Subsequently, the vehicle remote operation device 110 will be described. Similarly to the vehicle automatic operation device 10 according to the second embodiment, the vehicle remote operation device 110 includes the notification control unit 11, the consent-input person information acquisition unit 12a, the storage control unit 13a, the consent-input enabled person information acquisition unit 15, and the registration control unit 16. Instead of the automatic operation control unit 14a of the vehicle automatic operation device 10 in the second embodiment, the vehicle remote operation device 110 includes a remote operation control unit 114.

The remote operation control unit 114 receives an operation instruction received by the vehicle-side wireless communication device 50. The remote operation control unit 114 controls the traveling device group 70 according to the received operation instruction thereby to implement a vehicle traveling operation according to the operation instruction. The base station 200 or the remote operation terminal 300 transmits the operation instruction, and the vehicle-side wireless communication device 50 receives the transmitted operation instruction. As described later in detail, the operation instruction transmitted from the base station 200 is caused by a person when the person manipulates a remote operation manipulation unit 208 of the base station 200. The remote replacement operation is implemented when the vehicle 100 is operated by the instruction. On the other hand, according to the present embodiment, the operation instruction transmitted from the remote operation terminal 300 is not the replacement operation but the remote driving operation implemented by a person around the vehicle 100 after getting off the vehicle 100. That is, the person was an occupant of the vehicle 100. It is noted that the remote operation terminal 300 may be placed at a location distant from the vehicle 100, such as the base station 200, and the remote replacement operation may be implemented using the remote operation terminal 300.

The self-vehicle position acquisition unit 120 is configured successively to detect the present position of the vehicle 100. For example, the self-vehicle position acquisition unit 120 may include the GPS receiver 30 similarly to the above-described embodiments and may detect the self-vehicle position using the GPS receiver 30. Alternatively, the self-vehicle position acquisition unit 120 may include a sensor for autonomous navigation, such as a gyroscope sensor, a geomagnetism sensor, and/or a vehicle speed sensor, in addition to the GPS receiver 30 or instead of the GPS receiver 30. In this case, the self-vehicle position acquisition unit 120 may successively detect the self-vehicle position by utilizing information obtained by the sensor.

In addition to the function of each of the components 11 to 16, the vehicle remote operation device 110 is further configured to cause the vehicle-side wireless communication device 50 to transmit the consent-input enabled person information stored in the vehicle-side storage device 20a to the base station 200 when the above-described remote driving operation request start operation is implemented. The transmitted consent-input enabled person information is stored in the basestation-side storage device 202 (FIG. 13) of the base station 200. When the remote operation terminal 300 implements a remote operation start manipulation which is not the replacement operation, and when receiving a signal, which indicates the implementation of the remote operation start manipulation, via the vehicle-side wireless communication device 50, the remote operation terminal 300 causes the vehicle-side wireless communication device 50 to transmit the consent-input enabled person information stored in the vehicle-side storage device 20a to the remote operation terminal 300. The transmitted consent-input enabled person information is stored in a terminal-side storage device 302 (FIG. 14) of the remote operation terminal 300.

Figure 13:
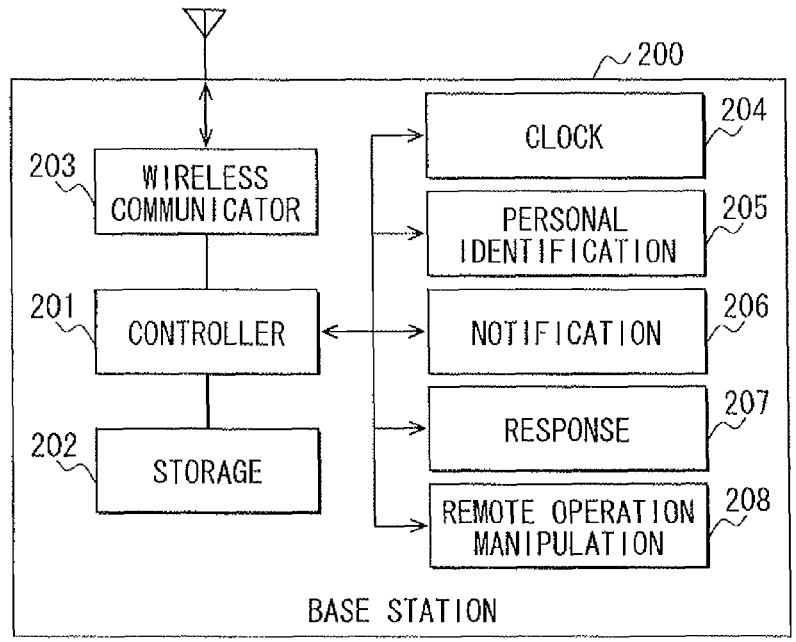
FIG. 13 is a block diagram showing a base station of the vehicle automatic operation system according to the third embodiment.

Subsequently, the configuration of the base station 200 will be described. FIG. 13 shows the configuration of the base station 200 according to the third embodiment. Similarly to the second embodiment, the base station 200 includes the basestation-side control device 201, the basestation-side storage device 202, and the basestation-side wireless communication unit 203. The base station 200 further includes a clock 204, a personal identification unit 205, a notification unit 206, a response unit 207, and a remote operation manipulation unit 208.

The basestation-side storage device 202 stores the consent-input enabled person information transmitted from the vehicle 100. In addition, the consent person information is also stored. The basestation-side storage device 202 successively stores the time and the present position of the vehicle 100 in the remote replacement operation and may also function as a history storage unit.

The basestation-side wireless communication unit 203 receives the consent-input enabled person information transmitted from the vehicle 100 and sends the received consent-input enabled person information to the basestation-side storage device 202. The clock 204 is used as a source of time and date information in the case where the base station side storage device 202 stores the date and time when the consent is inputted into the response unit 207 and time period information such as the start time and the end time of the remote driving operation.

The personal identification unit 205 is configured to identify an individual person who manipulates the remote operation manipulation unit 208. In the identification, the personal identification unit 205 uses the consent-input enabled person information stored in the basestation-side storage device 202. The personal identification unit 205 compares the information with the individual information obtained from the response unit 207 thereby to identify whether the person who implements the remote driving operation is the consent-input enabled person. The consent-input enabled person is a person who can input effectively the consent to a responsibility for an accident caused by the remote driving operation. In other words, the consent-input enabled person is a person who is to be allowed to drive the vehicle when making an agreement.

The notification unit 206 is a device such as a speaker and/or a display unit and configured to provide various information to a person who manipulates the response unit 207 and the remote operation manipulation unit 208. More specifically, the notification unit 206 provides information such as a notification to request the remote driving operation, a notification (driving operation responsibility information) showing that the remote operator has the driving operation responsibility, and/or a notification showing that the remote driving operation is disapproved. The notification unit 206 may provide a notification of a peripheral condition of the vehicle 100 under the remote driving operation. The peripheral condition of the vehicle 100 is detected by the sensor 60 of the vehicle 100 and is transmitted to the base station 200 via the vehicle-side wireless communication device 50.

The response unit 207 is a device such as a switch device and/or a microphone and is configured to receive a response from a person to a content notified from the notification unit 206. The information inputted into the response unit 207 is, for example, consent information showing agreement with a notification of the driving operation responsibility information. Information is not limited to be inputted to the content notified from the notification unit 206. Information may be inputted into the response unit 207 even when notification from the notification unit 206 is not implemented.

The remote operation manipulation unit 208 may function as a remote operation device and includes an input unit, such as a seat, a steering handle, an accelerator pedal, and/or a brake pedal, similarly to a driving simulator. A remote operator manipulates the remote operation manipulation unit 208 to implement the remote operation. The remote operator can input various operation instructions, such as a steering instruction, an acceleration-and-deceleration instruction, and the like, into the remote operation manipulation unit 208 using the input unit, similarly to a case where the person drives the vehicle 100. The operation instruction inputted into the remote operation manipulation unit 208 is transmitted to the basestation-side control device 201 and further transmitted to the vehicle 100 through the basestation-side wireless communication unit 203. Thus, the remote operation control unit 114 of the vehicle 100 causes the vehicle 100 to travel according to the operation instruction transmitted from the base station 200.

Subsequently, the configuration of the remote operation terminal 300 will be described. The remote operation terminal 300 is in a size such that the driver of the vehicle 100 can mobile. For example, the remote operation terminal 300 is same as a portable telephone terminal in size. A portable telephone terminal may have a function of the remote operation terminal 300.

Figure 14:
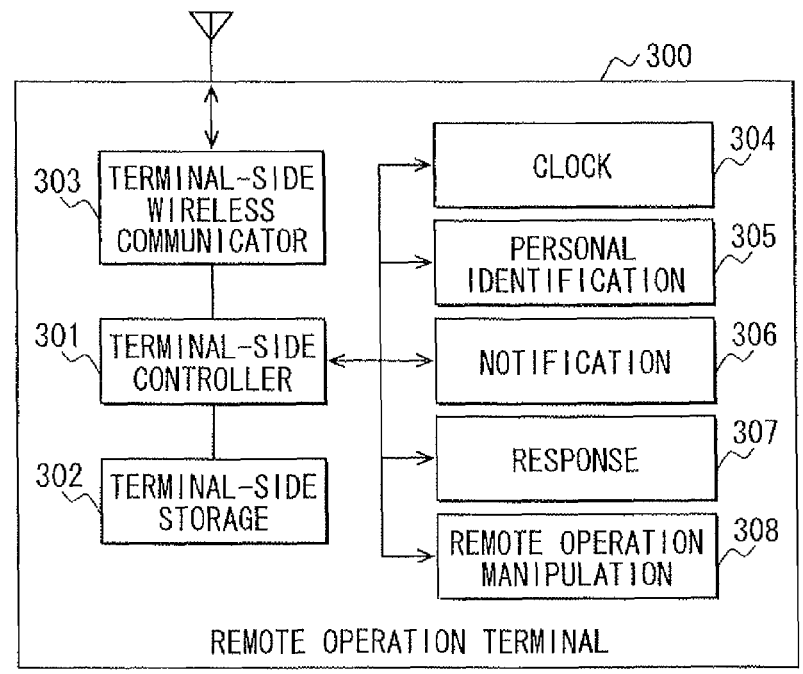
FIG. 14 is a block diagram showing a remote operation terminal of the vehicle automatic operation system according to the third embodiment.

As shown in FIG. 14, the remote operation terminal 300 includes a terminal-side control device 301, the terminal-side storage device 302, and a terminal-side wireless communication unit 303. These component of the remote operation terminal 300 have functions similar to those of the basestation-side control device 201, the basestation-side storage device 202, and the basestation-side wireless communication unit 203. The remote operation terminal 300 further includes a clock 304, a personal identification unit 305, a notification unit 306, a response unit 307, and a remote operation manipulation unit 308. These components of the remote operation terminal 300 have functions similar to those of the clock 204, the personal identification unit 205, the notification unit 206, and the remote operation manipulation unit 208 of the base station 200. The shapes of the components of the remote operation terminal 300 may be different from the shapes of the components of the base station 200. For example, the remote operation manipulation unit 308 has a configuration to input operation instructions, such as the steering instructions and/or the acceleration-and-deceleration instruction, by using a switch device, such as a mechanical switch device and/or a touch sensor.

Subsequently, the processing for implementing the remote replacement operation and the remote driving operation, which is not replacement operations, of the vehicle remote operation system according to the third embodiment will be described with reference to FIGS. 15, 16. As follows, the remote replacement operation will be described with reference to FIG. 15.

At step S501, the destination is first specified. Step S501 is executed when the remote replacement operation request start operation is implemented. When an occupant of the vehicle 100 requests the remote replacement operation to a remote replacement operator of the base station 200 by remote talk, the occupant instructs the destination to the remote replacement operator by remote talk. Alternatively, when the occupant of the vehicle 100 instructs the destination by a switch device operation, the occupant manipulates a HMI device group 40a to input the destination according to a predetermined destination instruction operation. The vehicle remote operation device 110 controls the vehicle-side wireless communication device 50 to cause the vehicle-side wireless communication device 50 to transmit the inputted destination to the base station 200. The basestation-side wireless communication unit 203 of the base station 200 receives the inputted destination, and the notification unit 206 notifies the destination.

At subsequent step S502, the notification unit 206 of the base station 200 notifies the driving operation responsibility information. The driving operation responsibility information represents a responsibility related to the remote driving operation, more specifically, represents that the remote operator has a responsibility when the vehicle 100 causes an accident in the remote driving operation. Similarly to the present remote driving operation, the responsibility related to the automatic driving operation in the first and second embodiments represents, more specifically, that a responsibility when the vehicle 100 causes an accident in the automatic driving operation.

At subsequent step S503, confirmation of consent to contract is implemented. The contract is undertaking of the request for the remote replacement operation instructed by the occupant of the vehicle 100. The consent to contract represents undertaking of the remote replacement operation on agreement of the driving operation responsibility notified at step S502. At step S503 subsequent to step S502, the confirmation of the consent to contract is implemented in the base station 200 by determining whether the remote replacement operator inputs a predetermined consent instruction or non-consent instruction (non-agreement instruction) into the response unit 207. The non-consent instruction may be caused when the remote replacement operator does not input any instruction in a predetermined time period.

When determination of the non-consent is made at step S503, the processing proceeds to step S505. Alternatively, when determination of the consent is made at step S503, the processing proceeds to step S504. At step S504, verification of information on the person who made the consent to contract at step S503 with respect to a requirement for permission is implemented thereby to determine whether the information coincides with the requirement according to the verification result. The requirement for permission is a requirement that the information of the person who made the consent to contract at step S503 is included in the consent-input enabled person information. The personal identification unit 205 implements the verification of the requirement for permission. The basestation-side storage device 202 stores the consent-input enabled person information transmitted from the vehicle 100. On the other hand, the information on the person who made the consent to contract is in the same category as the consent-input enabled person information stored in the basestation-side storage device 202 and obtained from the response unit 207. When it is determined that the information does not coincide with the requirement according to the verification result, the processing proceeds to step S505.

Step S505 is executed by the basestation-side control device 201. As step S505, the basestation-side control device 201 causes the notification unit 206 to notify disapproval of the remote replacement operation. Thereafter, an operation instruction is not transmitted to the vehicle 100, even when the remote operation manipulation unit 208 is manipulated.

Alternatively, when it is determined that the information coincides with the requirement according to the verification result at step S504, the processing proceeds to step S506. Step S506 is also executed by the basestation-side control device 201. At step S506, the basestation-side control device 201 causes the basestation-side storage device 202 to store the consent-input person information. The consent-input person information has the same meaning as those of the first and second embodiments and is the information by which a person who made the consent to contract at step S503 can be identified. As described in the first and second embodiments, the consent-input person information has various forms. In the present example, because of a reason why it is already obtained, the information used for the verification at step S504 is stored as the consent-input person information. In addition, the consent information, which represents that the consent to contract is made, and the date and time when the consent to contract is made are associated with the consent-input person information and the associated information is stored in the basestation-side storage device 202.

At subsequent step S507, peripheral condition recognition of the remote operation vehicle (vehicle 100) is implemented. At step S507, the vehicle remote operation device 110 causes the vehicle-side wireless communication device 50 to transmit the condition of the periphery of the vehicle detected by the sensor 60. In addition, the basestation-side control device 201 causes the notification unit 206 to notify the transmitted condition of the periphery of the vehicle. It is noted that the remote replacement operator implements step S507 directly. The vehicle remote operation device 110 further causes the vehicle-side wireless communication device 50 to transmit the present position of the vehicle 100 detected by the self-vehicle position acquisition unit 120. The remote replacement operator implements the peripheral condition recognition of the remote operation vehicle (vehicle 100) on notification by the notification unit 206.

At subsequent step S508, the remote driving operation is implemented. The remote replacement operator also implements the operation of step S508. Specifically, the remote replacement operator manipulates the remote operation manipulation unit 208 to input the operation instruction. The inputted operation instruction is transmitted from the base station 200 to the vehicle 100. The remote operation control unit 114 of the vehicle 100 receives the operation instruction and controls the traveling device group 70 according to the received operation instruction thereby to implement the vehicle traveling operation according to the operation instruction. In consideration of convenience of explanation, step S507 is separated from step S508. Nevertheless, the remote replacement operator may implement actually the operations of steps S507 and S508 simultaneously.

At step S509, the present time and the present position are associated with the consent-input person information stored at step S506 and the associated information is stored in the basestation-side storage device 202. The present time and the present position represent the history of the remote driving operation. The present time is obtained from the clock 204. The present position is transmitted from the vehicle 100 at step S507.

At step S510, it is determined whether the vehicle arrives at the destination. The determination is made by the remote replacement operator. When the vehicle does not arrive at the destination, the peripheral condition recognition, the remote driving operation, and the storing of the time and the position at steps S507 to S509 are continued. Alternatively, when the vehicle arrives at the destination, the remote driving operation is terminated.

Subsequently, the processing of the remote driving operation, which is not the replacement operation, will be described will reference to FIG. 16. In the description of FIG. 16, the remote driving operation, which is not the replacement operation, is simply denoted by the remote driving operation. In FIG. 16, the same steps as those in FIG. 15 represent the same contents as those of FIG. 15. As follows, contents different from those of FIG. 15 will be described.

At step S502, the driving operation responsibility information is notified. Step S502 is executed when the remote operation start manipulation is implemented on the remote operation terminal 300. The meaning of the driving operation responsibility information is the same as that in FIG. 15. In FIG. 16, the notification is implemented from the notification unit 306 of the remote operation terminal 300. Also in the following steps, the processing implemented by the base station 200 in FIG. 15 is substantially implemented by corresponding components of the remote operation terminal 300.

Figure 15:
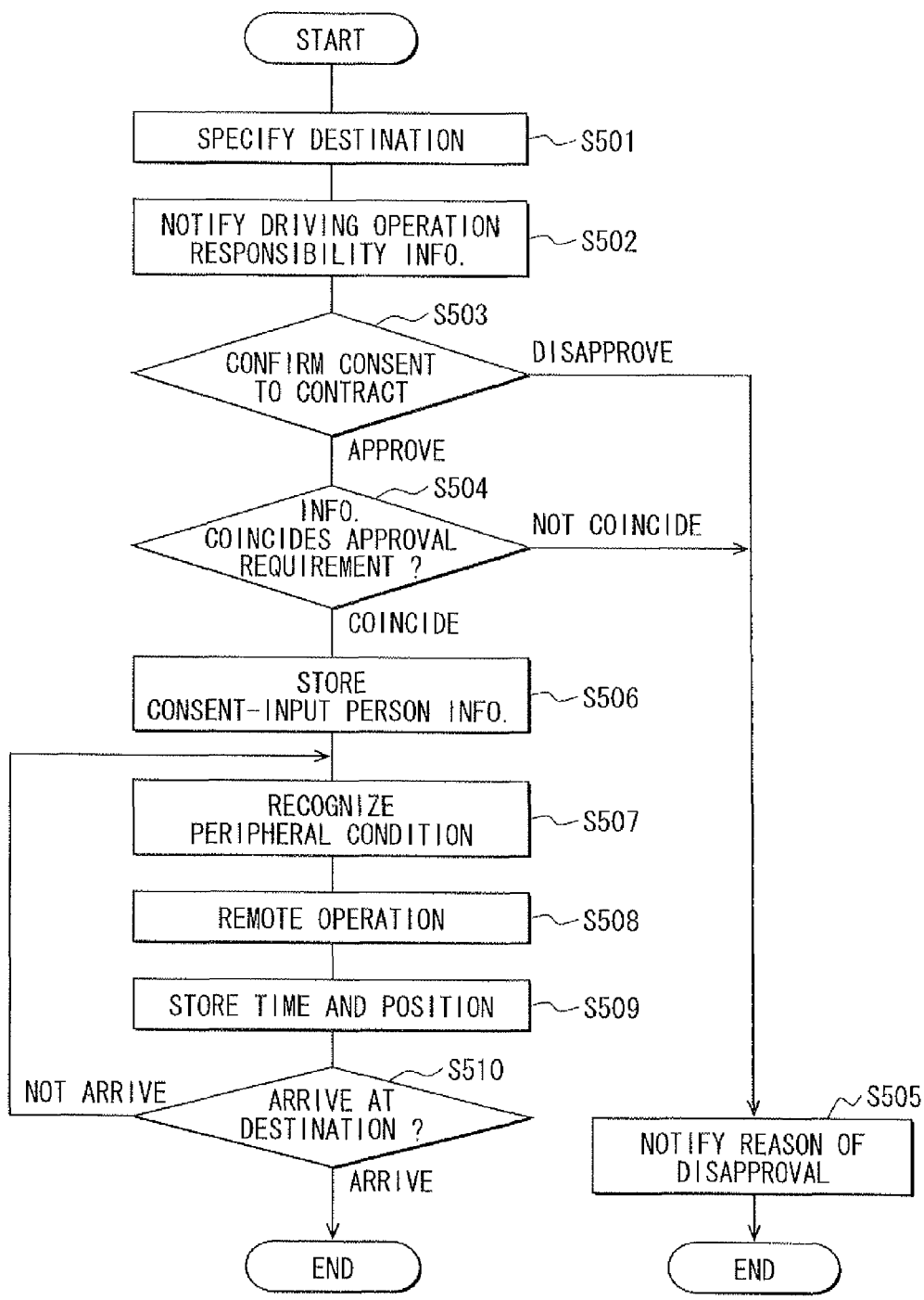
FIG. 15 is a flow chart showing a remote replacement operation according to the third embodiment.
Figure 16:
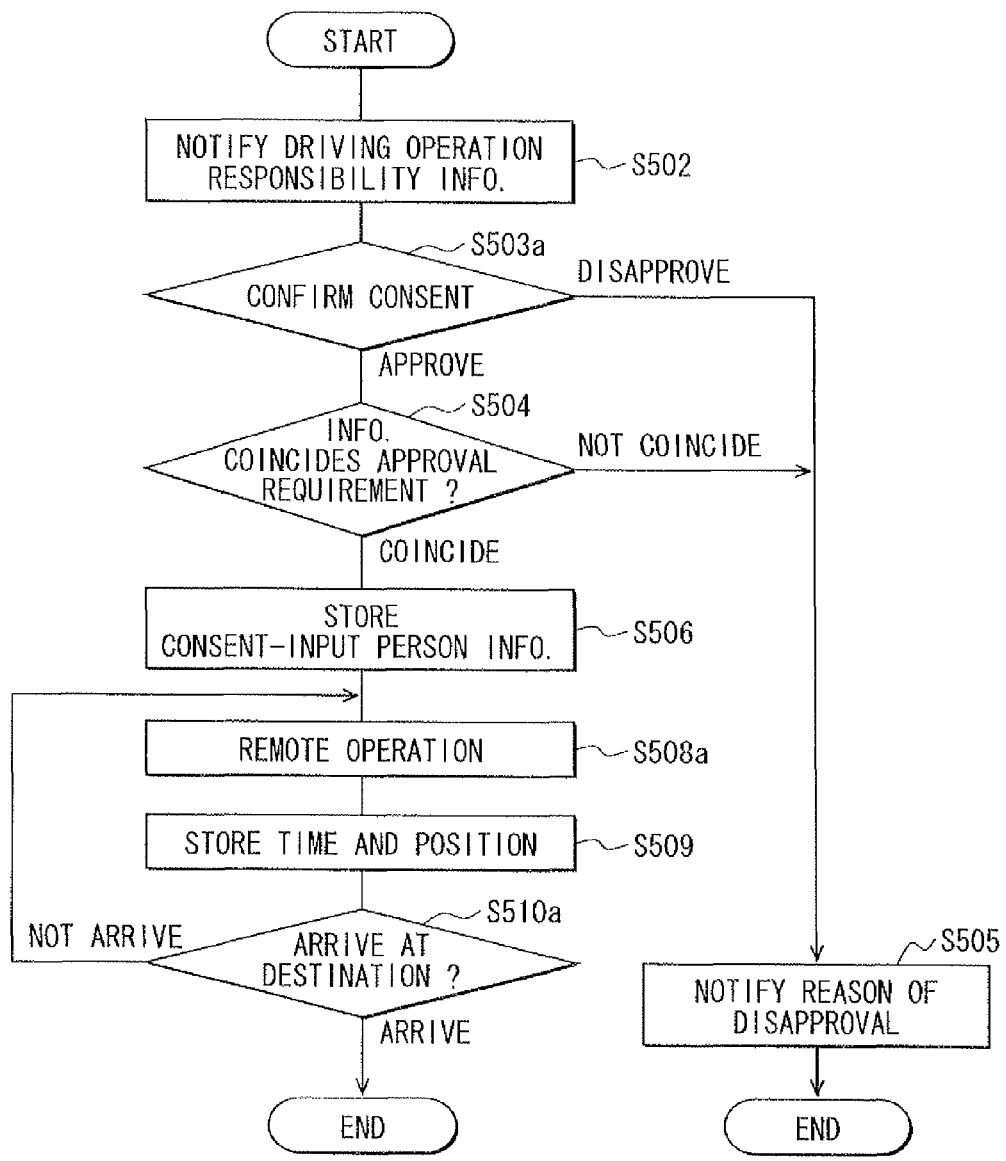
FIG. 16 is a flow chart showing a remote operation, which is not the remote replacement operation, according to the third embodiment.

In FIG. 16, step S501 (destination set) of FIG. 15 does not exit, since the occupant of the vehicle 100 carrying the remote operation terminal 300 implements the remote driving operation near the vehicle 100 after getting off the vehicle 100. It is convenient to implement the remote driving operation when, for example, the occupant parks the vehicle 100 in a narrow space where the door of the driver's seat cannot be easily opened in the parking position.

At subsequent step S503*a*, confirmation of the consent to the driving operation responsibility notified at step S502 is implemented. The remote driving operation of FIG. 16 is implemented by the occupant of the vehicle 100. Therefore, in the remote driving operation of FIG. 16, the consent is not made to the contract, dissimilarly to step S503 of FIG. 15. However, determination whether the consent or the non-consent is the same as step S503 of FIG. 15. The processing to execute steps S504 and S505 on determination of the consent or the non-consent is also the same as the processing of FIG. 15.

The contents of step S504 and the processing to execute steps S506 and S505 on determination of the coincidence or non-coincidence at step S504 is also the same as FIG. 15. The processing proceeds to step S508a subsequent to step S506. At step S508a, the occupant, who get off the vehicle 100, manipulates the remote operation terminal 300 thereby to implement the remote driving operation of the vehicle 100. Step S509 includes the same contents as that of FIG. 15. At step S510a, it is determined whether the vehicle arrives at the destination such as a parking partition. The determination is made by the remote operator. When the vehicle does not arrive at the destination, the remote driving operation and the storing of the time and the position at step S508a are continued. Alternatively, when the vehicle arrives at the destination, the remote driving operation is terminated.

In the third embodiment, at step S502, the base station 200 or the remote operation terminal 300 notifies the driving operation responsibility information before the start of the remote driving operation of the vehicle 100 At step S506, after the notification of the whereabouts of the responsibility related to the remote driving operation, the consent information and the consent-input person information are obtained, and the obtained consent information and the consent-input person information are associated. Thus, the associated information is stored (recorded) in the basestation-side storage device 202 or the terminal-side storage device 302. Thereafter, the remote driving operation is enabled. According to the present configuration, the consent information and the consent-input person information are associated and stored. Thereby, the consent input person can be identified according to the consent information and the consent-input person information in the case where the remote driving operation is started and thereafter when an accident occurs during the remote driving operation. Therefore, when an accident occurs during the remote driving operation, the whereabouts of the responsibility can be clarified steadily.

In addition, in the third embodiment, the time and the position, which represent the operation history under the remote driving operation, are stored in the basestation-side storage device 202 or the terminal-side storage device 302. Therefore, the time period and the section where the consent input person takes the responsibility for the remote driving operation can be clarified with reference to the history of the remote driving operation stored in the storage devices 202, 302.

Other Embodiment

The vehicle automatic operation system 1 is not limited to those of the first embodiment, the second embodiments, and the modifications of the embodiments. The vehicle automatic operation system 1 may be variously modified. For example, the embodiments may be modified as described below and may be in practical use.

In the first and second embodiments, the vehicle automatic operation device 10 or 10a associates the obtained consent information and the obtained consent-input person information and stores (records) the associated information in both the vehicle-side storage device 20 or 20a and the basestation-side storage device 202. The configuration is not limited to this. The associated information may be stored (recorded) in at least one of the vehicle-side storage device 20 and the basestation-side storage device 202. When a configuration to store (record) the information in the vehicle-side storage device 20 or 20a is employed, the vehicle-side wireless communication device 50 can be omitted. Therefore, in this case, the vehicle automatic operation device 10 or 10a can be simplified.

In the first embodiment or the second embodiment, the vehicle automatic operation device 10 or 10a may cause an illuminance sensor equipped in the vehicle 100 to detect illumination. In this case, when the detected illumination is less than or equal to a predetermined illumination and when the headlight of the vehicle 100 is not activated, the automatic traveling operation S10 or S10a and the automatic parking operation S20 or S20a may not be implemented.

In the first embodiment or the second embodiment, the vehicle automatic operation device 10 or 10a may cause an inclination sensor equipped in the vehicle 100 to detect inclination. In this case, when the detected inclination is greater than or equal to a predetermined inclination, the automatic traveling operation S10 or S10a and the automatic parking operation S20 or S20a may not be implemented.

In the first embodiment or the second embodiment, the content of the insurance applied when an accident occurs during the automatic driving operation of the vehicle 100 is stored in the vehicle-side storage device 20 or 20a. Alternatively, the content of the insurance may be stored in the basestation-side storage device 202.

In the first embodiment or the second embodiment, the vehicle automatic driving operation device 10 or 10a starts the automatic driving operation of the vehicle when receiving the record end signal after the consent information and the consent-input person information are associated with each other and the associated information is stored in both the vehicle-side storage device 20 or 20a and the basestation-side storage device 202. Alternatively, the vehicle automatic driving operation device 10 or 10a may start the automatic driving operation of the vehicle when obtaining the consent-input person information. Further, the vehicle automatic driving operation device 10 or 10a may start the automatic driving operation of the vehicle 100 when the consent is inputted after the whereabouts of the responsibility is notified.

In the third embodiment, the configuration of the vehicle 100 is similar to the configuration of the second embodiment. Alternatively, in the third embodiment, the configuration common in that of the second embodiment may be replaced with the configuration of the first embodiment.

In the third embodiment, the consent-input enabled person information may be beforehand stored in the basestation-side storage device 202 and/or the terminal-side storage device 302. In the third embodiment, when the driving operation responsibility information is notified, the insurance content may be also notified.

In the first and second embodiments, the operation history in the occupant non-manipulation operation (in the automatic driving operation in the first and second embodiments) may be stored, similarly to the third embodiment. It is not limited to store successively the history in the occupant non-manipulation operation as the operation history. Only information at the operation start point and the operation end point may be stored as the operation history. In the third embodiment, the operation history is the time and the position. The operation history may be one of the time and the position.

Summarizing the above embodiments, the consent information inputted into the operation unit is associated with the consent-input person information obtained by the consent-input person information acquisition unit, and the associated information is stored in the consent-input person information storage unit. Therefore, when the occupant non-manipulation operation of the vehicle is started, and thereafter an accident occurs in the occupant non-manipulation operation, the consent input person can be identified according to the consent information and the consent-input person information. Thus, dissimilarly to the art of JP-A-3-142507, in which the operator (consent input person) cannot be identified, the present configuration enables identification of the whereabouts of the responsibility when an accident occurs during the occupant non-manipulation operation. The consent input person is a person who actually inputted the consent into the operation unit. The consent-input person information is the information for identifying the consent input person.

It may be conceived that the occupant non-manipulation operation of the vehicle may be started even when the consent-input person information acquisition unit does not obtain the consent-input person information. In such a case, it may be conceived that the occupant non-manipulation operation is started after the consent is inputted and before the consent-input person information is obtained. In such a case, when an accident occurs in the occupant non-manipulation operation, it may be impossible to identify the whereabouts of the responsibility.

In consideration of such a case, the occupant non-manipulation operation control unit may be further configured to start the occupant non-manipulation operation of the vehicle in response to that the consent-input person information acquisition unit obtains the consent-input person information. In this way, the consent-input person information is obtained before starting of the occupant non-manipulation operation of the vehicle, thereby such a case can be avoided.

The system may be equipped in the vehicle equipped with the vehicle-side wireless communication unit configured as the consent-input enabled person information storage unit to implement wireless communications with the base station equipped with a basestation-side storage unit. In this case, the record unit may be further configured to cause the vehicle-side wireless communication unit to associate the consent information with the consent-input person information and to cause the basestation-side storage unit to store the consent information and the consent-input person information being associated.

In this case, the record unit may be further configured to cause the basestation-side storage unit as the consent-input person information storage unit to store the consent information and the consent-input person information being associated. In this way, even when an accident occurs in the occupant non-manipulation operation of the vehicle, breakage of the consent-input person information storage unit, that is, the basestation-side storage unit and breakage of the consent-input person information attributed to the accident can be avoided. Therefore, the consent input person can be further certainly identified, compared with a configuration to associate the consent information with the consent-input person information and store the associated information in the vehicle-side storage unit as the consent-input person information storage unit (equipped in the vehicle).

The system may be equipped in the vehicle equipped with the vehicle-side storage unit as the consent-input enabled person information storage unit, and the record unit may be further configured to associate the consent information with the consent-input person information and to cause the vehicle-side storage unit to store the consent information and the consent-input person information being associated. In the present configuration, the vehicle-side wireless communication unit can be omitted, and the vehicle occupant non-manipulation operation system can be simplified. The present configuration may be combined with the above-described configuration.

A configuration may be conceived to have no imitation to the consent input person. That is, anyone may be enabled actually to input the consent into the operation unit. In such a configuration having no restriction about the consent input person, the consent input person may be still identified when an accident occurs in the occupant non-manipulation operation of the vehicle, nevertheless, the identification of the consent input person may take long.

In consideration of this, the record unit may be further configured to, according to the consent-input person information and the consent-input enabled person information, which is information on the consent-input enabled person who can input the consent effectively, determine whether the consent input person coincides with the consent-input enabled person, and the record unit may be further configured to, when determining that the consent input person coincides with the consent-input enabled person, associate the consent information with the consent-input person information and store the consent information and the consent-input person information being associated. In this case, the occupant non-manipulation operation control unit may be further configured to, according to the consent-input enabled person information and the consent-input person information, determine whether the consent input person coincides with the consent-input enabled person, and the occupant non-manipulation operation control unit may be further configured to, when determining that the consent input person coincides with the consent-input enabled person, start the occupant non-manipulation operation of the vehicle.

In the present configuration, even when a person, who is not the consent-input enabled person, inputs the consent into the operation unit, the occupant non-manipulation operation of the vehicle is not started. Therefore, an accident does not occur in the occupant non-manipulation operation of the vehicle. In addition, when the automatic operation of the vehicle is started and when an accident occurs during the automatic operation of the vehicle, the consent input person is limited to the consent-input enabled person registered in the consent-input enabled person information storage unit. Therefore, the consent input person can be quickly identified.

The system may further include: the consent-input enabled person information acquisition unit configured to obtain the consent-input enabled person information; and the registration unit configured to cause the consent-input enabled person information storage unit to register the consent-input enabled person information. In the present configuration, registration of the consent-input enabled person is enabled.

The system may be equipped in the vehicle equipped with the vehicle-side wireless communication unit configured as the consent-input enabled person information storage unit to implement wireless communications with the base station equipped with the basestation-side storage unit. In this case, the registration unit may be further configured to cause the vehicle-side wireless communication unit to register the consent-input enabled person information on the basestation-side storage unit, and the occupant non-manipulation operation control unit may be further configured to cause the vehicle-side wireless communication unit to determine whether the consent input person coincides with the consent-input enabled person.

The registration unit may be configured as the consent-input enabled person information storage unit to register the consent-input enabled person information on the basestation-side storage unit. In this way, even when an accident occurs in the occupant non-manipulation operation of the vehicle, breakage of the consent-input enabled person information storage unit, that is, the basestation-side storage unit and breakage of the consent-input enabled person information attributed to the accident can be avoided.

The system may be equipped in the vehicle equipped with the vehicle-side storage unit as the consent-input enabled person information storage unit, and the registration unit may be further configured to register the consent-input enabled person information on the vehicle-side storage unit. In the present configuration, the vehicle-side wireless communication unit can be omitted, and the vehicle occupant non-manipulation operation system can be simplified. The present configuration may be combined with the above-described configuration.

The notification unit may be further configured to notify the content of the insurance applied when an accident occurs in the occupant non-manipulation operation of the vehicle. In the present configuration, the consent input person can input the consent after confirming the content of the insurance.

The consent-input person information acquisition unit may have various kinds of acquisition modes of the consent-input person information. Specifically, for example, the consent-input person information acquisition unit may be further configured to cause the imaging device to obtain the image of the face of the consent input person who has inputted the consent into the operation unit and to obtain the facial image information on the obtained image as the consent-input person information. Alternatively, the consent-input person information acquisition unit may be further configured to cause the imaging device to obtain the image of the driver's license of the consent input person who has inputted the consent into the operation unit and to obtain the driver's license image information on the obtained image as the consent-input person information. Alternatively, the consent-input person information acquisition unit may be further configured to cause the imaging device to obtain the image of the fingerprint of the consent input person who has inputted the consent into the operation unit and to obtain the fingerprint image information on the obtained image as the consent-input person information. The consent-input person information acquisition unit may be further configured to enable input of the personal information on the consent input person, who has inputted the consent into the operation unit, into the operation unit and to obtain the personal information on the consent input person as the consent-input person information. In the present configuration, the consent input person can be identified according to the consent-input person information obtained by the consent-input person information acquisition unit. These configurations may be combined with each other. The consent-input enabled person information acquisition unit may be further configured to obtain information, which is same kind as the information obtained by the consent-input person information acquisition unit as the consent-input person information, as the consent-input enabled person information.

The system may further include the history record unit configured to, in response to input of the consent into the operation unit, record at least one of the time period history and the vehicle position history when the occupant non-manipulation operation is started. In the present configuration, the time period and the section of the occupant non-manipulation operation, where the consent input person has the responsibility, can be clarified with reference to the history in the occupant non-manipulation operation stored in the history record unit. The history may be at least one of the time period history and the vehicle position history.

As already stated, the occupant non-manipulation operation may be categorized into the automatic driving operation (automatic operation) and the remote driving operation. The system may further include the automatic driving operation control unit configured as the occupant non-manipulation operation control unit to implement the automatic operation to operate the vehicle without manipulation of a person.

The automatic driving operation control unit may implement the automatic driving operation (automatic operation) in various modes. Specifically, for example, the automatic driving operation control unit may be further configured to implement the automatic traveling of the vehicle as the automatic operation of the vehicle to cause the vehicle to automatically travel along with the path to the destination. Alternatively, the automatic driving operation control unit may be further configured to implement the automatic parking of the vehicle as the automatic operation of the vehicle to cause the vehicle to automatically park in the target parking partition. Alternatively, the automatic driving operation control unit may be further configured to implement the automatic tailing of the vehicle as the automatic operation of the vehicle to cause the vehicle to automatically follow the target preceding vehicle. Alternatively, the automatic driving operation control unit may be further configured to implement an automatic braking of the vehicle as the automatic operation of the vehicle to cause the vehicle to automatically brake the vehicle.

The vehicle occupant non-manipulation operation system may be equipped in the vehicle in which the notification unit and the operation unit may be located at any seat. In general, the driver of the vehicle may be the consent input person in many cases. In consideration of this, the system may be equipped in the vehicle in which the notification unit and the operation unit may be located at the driver's seat.

The system may further include: the notification unit configured to notify, before start of the occupant non-manipulation operation, that the consent input person has the whereabouts of the responsibility related to the occupant non-manipulation operation of the vehicle; and the operation unit configured to, after the notification unit notifies the whereabouts of the responsibility, receive input of the consent.

The operation unit is not limited to receive the input of the consent of a person in the vehicle. The operation unit may be configured to receive the input of the consent of a person located out of the vehicle. Specifically, the notification unit and the operation unit may be equipped in the base station, and the system may further include the vehicle-side wireless communication unit equipped in the vehicle and configured to implement wireless communications with the base station. In the present configuration, not only a person in the vehicle but also a person in the base station is enabled to input the consent into the operation unit thereby to start the occupant non-manipulation operation of the vehicle.

The system may further include the remote operation device located outside of the vehicle or configured to be carried by a person, the remote operation device being configured to enable a person to input the operation instruction related to the vehicle into the remote operation device; and the remote operation control unit equipped as the occupant non-manipulation operation control unit in the vehicle and configured to operate the vehicle according to the operation instruction from the remote operation device. In the present configuration, the remote driving operation is enabled.

The system may implement the remote replacement operation as the remote driving operation. The remote replacement operation is a driving operation implemented by a person at a place distant from the vehicle, instead of an occupant of the vehicle. In the case of the remote replacement operation, the occupant of the vehicle needs to request the remote replacement operator to implement the remote replacement operation.

The system may further include: the remote operation request unit configured to be manipulated by an occupant of the vehicle in order to request a person who manipulates the remote operation device to manipulate the remote operation device to implement the remote driving operation of the vehicle; and the transmission unit configured to transmit the remote operation request signal to the remote operation device based on manipulation of the remote operation request unit. The remote operation request unit and the transmission unit may be equipped in the vehicle or may be carried by a user of the vehicle. The remote operation device may include: the receiving unit configured to receive the remote operation request signal; and the request notification unit configured to notify the user of the remote control request based on that the receiving unit receives the remote operation request signal. The present configuration enables an occupant of the vehicle to request the remote driving operation (namely, remote replacement operation) to a person when manipulates the remote operation device.

The voice input unit may include the microphone. In the present configuration, the remote driving operation can be requested with reducing occasions to use a hand. The remote driving operation may be requested by a switch device operation.

The above structures of the embodiments can be combined as appropriate. The above processings such as calculations and determinations are not limited being executed by the vehicle automatic operation device 10, 10a, the vehicle remote operation device 110, the basestation-side control device 201, the terminal-side control device 301, and/or the like. The control unit may have various structures including the above-described control devices shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A non-manipulation operation system comprising:
   a notification unit configured to, before start of a non-manipulation operation to operate a vehicle without manipulation of an occupant of the vehicle, cause a notification device to notify that a consent input person has whereabouts of a responsibility related to the non-manipulation operation;
   a consent-input person information acquisition unit configured to, after the notification unit notifies the whereabouts of the responsibility, obtain consent-input person information for identifying the consent input person who inputs a consent into an operation unit;
   a record unit configured to associate consent information on the consent inputted into the operation unit with the consent-input person information obtained by the consent-input person information acquisition unit to cause a consent-input person information storage unit to store the consent information and the consent-input person information being associated; and
   a non-manipulation operation control unit configured to, after the notification unit notifies the whereabouts of the responsibility, start the non-manipulation operation of the vehicle, in response to input of the consent into the operation unit.

2. The non-manipulation operation system according to claim 1, wherein the non-manipulation operation control unit is further configured to start the non-manipulation operation of the vehicle in response to that the consent-input person information acquisition unit obtains the consent-input person information.

3. The non-manipulation operation system according to claim 1, wherein
   the system is equipped in the vehicle including a vehicle-side wireless communication unit configured as the consent-input person information storage unit to implement wireless communications with a base station equipped with a basestation-side storage unit, and
   the record unit is further configured to cause the vehicle-side wireless communication unit to associate the consent information with the consent-input person information and to cause the basestation-side storage unit to store the consent information and the consent-input person information being associated.

4. The non-manipulation operation system according to claim 1, wherein
   the system is equipped in the vehicle including a vehicle-side storage unit as the consent-input person information storage unit, and
   the record unit is further configured to associate the consent information with the consent-input person information and to cause the vehicle-side storage unit to store the consent information and the consent-input person information being associated.

5. The non-manipulation operation system according to claim 1, wherein
   the record unit is further configured to, according to the consent-input person information and consent-input enabled person information, determine whether the consent input person coincides with a consent-input enabled person who can input the consent effectively, the consent-input enabled person information being on the consent-input enabled person,
   the record unit is further configured to, on determination that the consent input person coincides with the consent-input enabled person, associate the consent information with the consent-input person information and store the consent information and the consent-input person information being associated,
   the non-manipulation operation control unit is further configured to, according to the consent-input person information and the consent-input enabled person information, determine whether the consent input person coincides with the consent-input enabled person, and
   the non-manipulation operation control unit is further configured to, when determining that the consent input person coincides with the consent-input enabled person, start the non-manipulation operation of the vehicle.

6. The non-manipulation operation system according to claim 5, further comprising:
   a consent-input enabled person information acquisition unit configured to obtain the consent-input enabled person information; and
   a registration unit configured to cause a consent-input enabled person information storage unit to register the consent-input enabled person information.

7. The non-manipulation operation system according to claim 6, wherein
   the system is equipped in the vehicle including a vehicle-side wireless communication unit configured as the consent-input enabled person information storage unit to implement wireless communications with a base station equipped with a basestation-side storage unit,
   the registration unit is further configured to cause the vehicle-side wireless communication unit to register the consent-input enabled person information on the basestation-side storage unit, and
   the non-manipulation operation control unit is further configured to cause the vehicle-side wireless communication unit to determine whether the consent input person coincides with the consent-input enabled person.

8. The non-manipulation operation system according to claim 6, wherein
   the system is equipped in the vehicle including a vehicle-side storage unit as the consent-input enabled person information storage unit, and
   the registration unit is further configured to register the consent-input enabled person information on the vehicle-side storage unit.

9. The non-manipulation operation system according to claim 1, wherein the notification unit is further configured to notify a content of an insurance applied when an accident occurs in the non-manipulation operation of the vehicle.

10. The non-manipulation operation system according to claim 1, wherein the consent-input person information acquisition unit is further configured to cause an imaging device to obtain an image of a face of the consent input person who inputs the consent into the operation unit and to obtain facial image information on the obtained image as the consent-input person information.

11. The non-manipulation operation system according to claim 1, wherein the consent-input person information acquisition unit is further configured to cause an imaging device to obtain an image of a driver's license of the consent input person who inputs the consent into the operation unit and to obtain driver's license image information on the obtained image as the consent-input person information.

12. The non-manipulation operation system according to claim 1, wherein the consent-input person information acquisition unit is further configured to cause an imaging device to obtain an image of a fingerprint of the consent input person who inputs the consent into the operation unit and to obtain fingerprint image information on the obtained image as the consent-input person information.

13. The non-manipulation operation system according to claim 1, wherein the consent-input person information acquisition unit is further configured to enable a person to input personal information on the consent input person, who inputs the consent into the operation unit, into the operation unit and to obtain the personal information on the consent input person as the consent-input person information.

14. The non-manipulation operation system according to claim 5, wherein the consent-input enabled person information acquisition unit is further configured to obtain the consent-input enabled person information, which is same kind as the consent-input person information obtained by the consent-input person information acquisition unit.

15. The non-manipulation operation system according to claim 1, further comprising:
   a history record unit configured to, in response to input of the consent into the operation unit, record at least one of a time period history and a vehicle position history when the non-manipulation operation is started.

16. The non-manipulation operation system according to claim 1, further comprising:
   an automatic driving operation control unit configured as the non-manipulation operation control unit to implement an automatic operation to operate the vehicle without manipulation of a person.

17. The non-manipulation operation system according to claim 16, wherein the automatic driving operation control unit is further configured to implement an automatic traveling as the automatic operation to cause the vehicle to automatically travel along with a path to a destination.

18. The non-manipulation operation system according to claim 16, wherein the automatic driving operation control unit is further configured to implement an automatic parking as the automatic operation to cause the vehicle to automatically park in a target parking partition.

19. The non-manipulation operation system according to claim 16, wherein the automatic driving operation control unit is further configured to implement an automatic tailing as the automatic operation to cause the vehicle to automatically tail a target preceding vehicle.

20. The non-manipulation operation system according to claim 16, wherein the automatic driving operation control unit is further configured to implement an automatic braking as the automatic operation to cause the vehicle to automatically brake the vehicle.

21. The non-manipulation operation system according to claim 16, wherein the system is equipped in the vehicle including the notification unit and the operation unit located at a driver's seat.

22. The non-manipulation operation system according to claim 1, further comprising:
   the notification unit configured to notify, before start of the non-manipulation operation, that the consent input person has the whereabouts of the responsibility related to the non-manipulation operation of the vehicle; and
   the operation unit configured to, after the notification unit notifies the whereabouts of the responsibility, receive input of the consent.

23. The non-manipulation operation system according to claim 22, wherein the notification unit and the operation unit are equipped in a base station,
   the non-manipulation operation system further comprising:
   a vehicle-side wireless communication unit equipped in the vehicle and configured to implement wireless communications with the base station.

24. The non-manipulation operation system according to claim 1, further comprising:
   a remote operation device located outside of the vehicle or configured to be carried by a person, the remote operation device being configured to enable a person to input an operation instruction for the vehicle into the remote operation device; and
   a remote operation control unit equipped as the non-manipulation operation control unit in the vehicle and configured to operate the vehicle according to the operation instruction from the remote operation device.

25. The non-manipulation operation system according to claim 24, further comprising:
- a remote operation request unit configured to enable an occupant of the vehicle to manipulate the remote operation request unit in order to request a person to manipulate the remote operation device to implement a remote driving operation of the vehicle; and
- a transmission unit configured to transmit a remote operation request signal to the remote operation device in response to manipulation of the remote operation request unit, wherein the remote operation device includes:
a receiving unit configured to receive the remote operation request signal; and
a request notification unit configured to notify a user of the remote control request in response to the remote operation request signal received by the receiving unit.

26. The non-manipulation operation system according to claim 25, wherein the remote operation request unit is a voice input unit including a microphone.

27. A method for preparing for a non-manipulation operation to operate a vehicle without manipulation of an occupant of a vehicle, the method comprising:
- receiving input of a consent to the non-manipulation operation from a consent input person;
- notifying that the consent input person has whereabouts of a responsibility related to the non-manipulation operation;
- obtaining consent-input person information for identifying the consent input person;
- associating consent information on the inputted consent with the obtained consent-input person information;
- storing the consent information and the consent-input person information being associated; and
- starting the non-manipulation operation in response to receiving the input of the consent after the notifying.

28. A computer readable medium comprising instructions executed by a computer, the instructions including the method according to claim 27.

* * * * *